(12) United States Patent
Sakata et al.

(10) Patent No.: US 11,137,589 B2
(45) Date of Patent: Oct. 5, 2021

(54) STAGE APPARATUS AND LINEAR ACTUATOR

(71) Applicants: CANON KABUSHIKI KAISHA, Tokyo (JP); CANON PRECISION INC., Hirosaki (JP)

(72) Inventors: Tsuguhide Sakata, Machida (JP); Masahiro Ando, Yokohama (JP); Hiroki Kobayashi, Hirosaki (JP); Takuji Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 16/211,468

(22) Filed: Dec. 6, 2018

(65) Prior Publication Data

US 2019/0107703 A1   Apr. 11, 2019

Related U.S. Application Data

(63) Continuation of application No. PCT/JP2017/019127, filed on May 23, 2017.

(30) Foreign Application Priority Data

Jun. 9, 2016  (JP) .............................. JP2016-115693

(51) Int. Cl.
*G02B 21/26* (2006.01)
*H02K 7/00* (2006.01)
*H02K 41/03* (2006.01)

(52) U.S. Cl.
CPC ............. *G02B 21/26* (2013.01); *H02K 7/003* (2013.01); *H02K 41/031* (2013.01)

(58) Field of Classification Search
None
See application file for complete search history.

(56) References Cited

U.S. PATENT DOCUMENTS 4,956,944 A   9/1990 Ando et al.
4,974,368 A   12/1990 Miyamoto et al.
(Continued)

FOREIGN PATENT DOCUMENTS

JP   2006178204 A   7/2006
JP   2013160960 A   8/2013
(Continued)

OTHER PUBLICATIONS

THK Linear Electromechanical Actuator (Year: 2016).*
(Continued)

*Primary Examiner* — Reza Aghevli
(74) *Attorney, Agent, or Firm* — Venable LLP

(57) ABSTRACT

A stage apparatus that reduces generation of a slight movement of a stage position (observation position) when switching between the automatic mode and the manual mode. The stage apparatus comprises: a first stage; a second stage that moves relatively in a first direction on a surface of the first stage; a first driving unit configured for driving a first driven portion configured to move the second stage relatively in the first direction by a manual driving force; and a second driving unit configured for driving a second driven portion configured to move the second stage relatively in the first direction by an electromotive driving force, wherein the first driven portion and the second driven portion have a common operating axis at least partially.

14 Claims, 25 Drawing Sheets

(56) References Cited

U.S. PATENT DOCUMENTS

| | | | |
|---|---|---|---|
| 4,999,954 A | | 3/1991 | Miyamoto et al. |
| 5,347,763 A | | 9/1994 | Miyamoto et al. |
| 5,702,662 A | * | 12/1997 | Smith .................. H05K 3/0026 |
| | | | 264/101 |
| 5,705,789 A | * | 1/1998 | Smith .................... B23K 26/04 |
| | | | 219/121.78 |
| 6,552,449 B2 | * | 4/2003 | Tsuboi ................. B23Q 1/4866 |
| | | | 310/12.06 |
| 7,230,676 B1 | * | 6/2007 | Loopstra ............. G03F 7/70341 |
| | | | 355/30 |
| 10,330,581 B2 | * | 6/2019 | Robinson ............... G01N 15/14 |
| 10,384,238 B2 | * | 8/2019 | Robinson .............. G03F 7/0002 |
| 2002/0159653 A1 | * | 10/2002 | Dekel .................. H04N 19/635 |
| | | | 382/282 |
| 2002/0163257 A1 | * | 11/2002 | Tsuboi ................. H02K 41/031 |
| | | | 310/12.06 |
| 2006/0022694 A1 | * | 2/2006 | Brunner ................ H01J 37/185 |
| | | | 324/750.16 |
| 2008/0078943 A1 | * | 4/2008 | Kawai .................. H01J 37/153 |
| | | | 250/397 |
| 2010/0108904 A1 | * | 5/2010 | Adamec ............... H01J 37/1471 |
| | | | 250/397 |
| 2011/0089771 A1 | | 4/2011 | Brooker et al. |
| 2011/0290062 A1 | * | 12/2011 | Faubion ................. G05G 11/00 |
| | | | 74/490.13 |
| 2014/0285122 A1 | * | 9/2014 | Lu ............................ H02K 7/09 |
| | | | 318/135 |
| 2015/0263586 A1 | | 9/2015 | Muramatsu |
| 2015/0371895 A1 | * | 12/2015 | Yokomichi ....... H01L 21/76816 |
| | | | 438/381 |
| 2016/0263632 A1 | * | 9/2016 | Robinson .................. G03F 1/82 |
| 2016/0266165 A1 | * | 9/2016 | Robinson .................. B08B 1/00 |
| 2019/0271631 A1 | * | 9/2019 | Robinson .............. B08B 7/0028 |
| 2019/0337025 A1 | * | 11/2019 | Robinson ................ B08B 1/001 |

FOREIGN PATENT DOCUMENTS

| | | | | |
|---|---|---|---|---|
| JP | 5620503 B2 | | 11/2014 | |
| JP | 2016200803 A | | 12/2016 | |
| KR | 20100105425 A | * | 9/2010 | ........... H01L 21/027 |
| WO | WO-2009121051 A3 | * | 1/2010 | ........... G01N 23/044 |
| WO | 2011047367 A1 | | 4/2011 | |
| WO | 2014069190 A1 | | 5/2014 | |

OTHER PUBLICATIONS

Warner Linear Actuator (Year: 2016).*
Siemens Linear Motor (Year: 2016).*
International Search Report issued in corresponding Parent International Application No. PCT/JP2017/019127 dated Aug. 29, 2017.
Written Opinion of the International Searching Authority issued in corresponding Parent International Application No. PCT/JP2017/019127 dated Aug. 29, 2017.

* cited by examiner

STAGE APPARATUS AND LINEAR ACTUATOR

CROSS-REFERENCE TO RELATED APPLICATIONS

This application is a Continuation of International Patent Application No. PCT/JP2017/019127, filed May 23, 2017, which claims the benefit of Japanese Patent Application No. 2016-115693, filed Jun. 9, 2016, both of which are hereby incorporated by reference herein in their entirety.

BACKGROUND OF THE INVENTION

Field of the Invention

The present invention relates to a stage apparatus and a linear actuator used to drive the stage apparatus.

Background Art

A stage apparatus (to be referred to as a microscope stage hereinafter) used for a microscope holds an observation target slide glass and moves in the x and y directions with respect to an objective lens so that a desired observation region enters a microscopic field. In particular, cellular-level observation is requested of a microscope used in pathological diagnosis, so high position management precision is requested of the microscope stage. As an operation means for moving a slide glass in the x and y directions, a manual operation mechanism of turning x- and y-direction knobs manually is used because high-precision fine operability and responsiveness are important.

PTL 1 discloses a motorized stage that is usable as a microscope stage and uses a cylindrical linear motor. The cylindrical linear motor hardly generates a backlash in principle and can automatically control an observation position on the stage apparatus at high precision.

CITATION LIST

Patent Literature

PTL 1: Japanese Patent No. 5620503

Generally in pathological diagnosis, observation is performed by moving the microscope stage in a manual mode. In the manual mode, it is required to move an observation position with high-precision fine operability and responsiveness. The microscope stage needs to implement an automatic mode in which the stage is moved by a motor, in addition to the manual mode. In the automatic mode, the position of a region of interest observed in the manual mode is stored as, for example, x- and y-coordinates and the microscope stage can automatically return to the stored position quickly at high precision.

The motorized stage described in PTL 1 can implement driving of the stage in the automatic mode. Further, a pseudo manual mode can be implemented by driving the motorized stage based on an electrical signal obtained from a manual operation member such as a joy stick or a knob. However, in the pseudo manual mode, a fine operation by a user is not reflected quickly at high precision and the user feels stressed. In the manual mode, it is desirable to use an arrangement of converting a user operation into a stage movement by a mechanical structure. To implement a stage apparatus that realizes the automatic mode and the manual mode, it is considered to provide a mechanism for the automatic mode, such as the motorized stage in PTL 1, a mechanism for the manual mode, and a mechanism for switching between them. In addition, a stage mechanism is required, which does not generate a slight movement of an observation position when switching from the manual mode to the automatic mode or from the automatic mode to the manual mode. This is because such a slight movement appears greatly in an observation image at the time of microscopic observation and the user feels stressed.

According to an embodiment of the present invention, there is provided a stage apparatus that reduces generation of a slight movement of a stage position (observation position) when switching between the automatic mode and the manual mode.

SUMMARY OF THE INVENTION

According to one aspect of the present invention, there is provided a stage apparatus comprising: a first stage; a second stage that moves relatively in a first direction on a surface of the first stage; a first driving unit configured to drive a first driven portion configured to move the second stage relatively in the first direction by a manual driving force; and a second driving unit configured to drive a second driven portion configured to move the second stage relatively in the first direction by an electromotive driving force, wherein the first driven portion and the second driven portion have a common operating axis at least partially.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described with reference to the accompanying drawings.

First Embodiment

Figure 1:
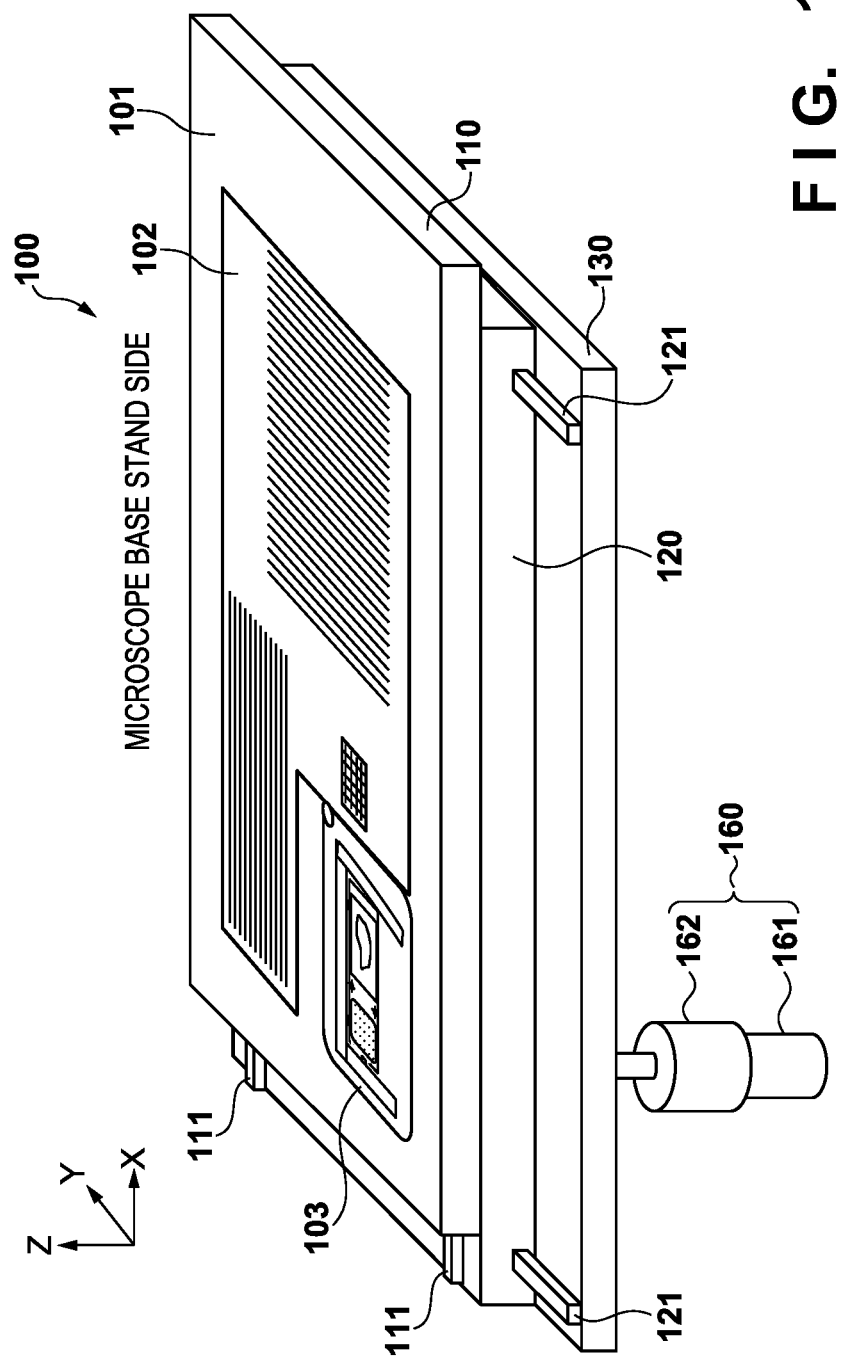
FIG. 1 is a schematic view showing an example of the outer appearance of a stage apparatus 100 according to an embodiment.

FIG. 1 is a schematic view showing the outer appearance of a stage apparatus 100 according to the first embodiment. In this embodiment, an example will be explained, in which the stage apparatus 100 is used as a microscope stage configured to hold an observation target slide on it and move in the x and y directions with respect to the microscope base stand of a microscope. The stage apparatus 100 is an xy stage having a structure in which a stage base 130, a y stage 120, and an x stage 110 are stacked. Note that the stacking order is not limited to the example in FIG. 1 and the y stage 120 may be provided on the x stage 110. In the stage apparatus 100, the y stage 120 moves relatively in the y direction on the surface of the stage base 130. The x stage 110 moves relatively in the x direction on the surface of they stage 120. The stage base 130 corresponds to an example of the first stage and the y stage 120 corresponds to an example of the second stage. The x stage 110 corresponds to an example of the third stage. The y direction corresponds to an example of the first direction and the x direction corresponds to an example of the second direction. Note that the y stage 120 may be regarded as an example of the first stage and the x stage 110 may be regarded as an example of the second stage. In this case, the x direction is an example of the first direction.

More specifically, the stage base 130 is fixed to the z base (not shown) of the microscope base stand of the microscope. They stage 120 can move in the y direction along y-axis cross roller guides 121 on the stage base 130, and the x stage 110 can move in the x direction along x-axis cross roller guides 111 on the y stage 120. As a result, an xy stage is provided, which can move a position management surface stage 101 formed on the x stage 110 in two, x and y directions with respect to the stage base 130 (with respect to the microscope base stand of the microscope). The position management surface stage 101 includes an xy scale plate 102 configured to perform position management of the position management surface stage 101, and a slide stage 103 on which a slide is mounted. Note that it suffices for the xy stage to be movable in the x and y directions with respect to an objective lens while a slide is mounted, and the arrangement (for example, the position management surface stage 101) for managing an xy position is not limited to one in FIG. 1. A user can move the x stage 110 in the x direction by turning an x knob 161 of a manual knob 160 and move the y stage 120 in the y direction by turning a y knob 162. The user can therefore move the position management surface stage 101 in the x and y directions by manipulating the manual knob 160. The y knob 162 corresponds to an example of the first driving means. The x knob 161 corresponds to an example of the third driving means.

Figure 2:
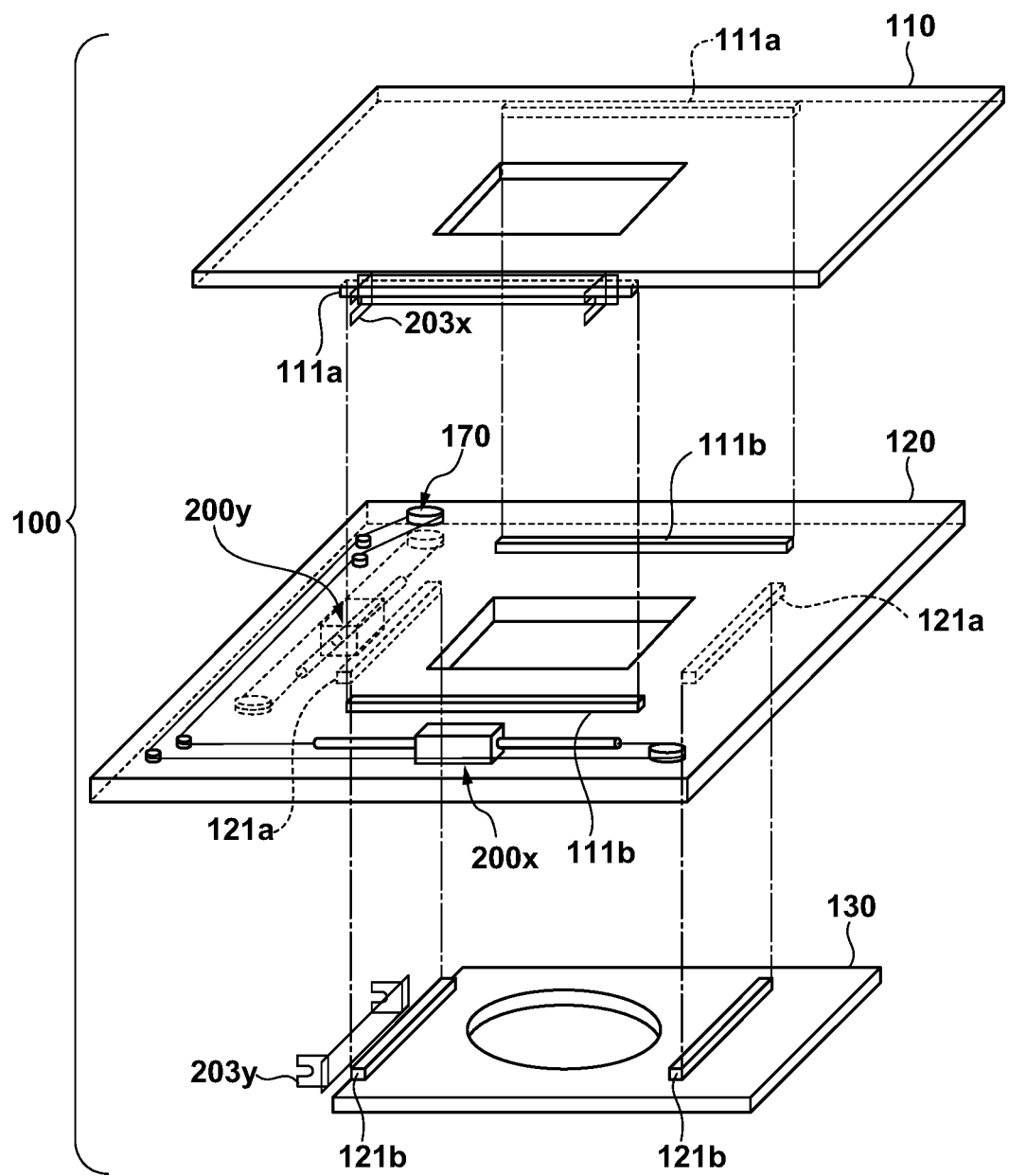
FIG. 2 is a view showing an example of the outer appearances of an x stage, y stage, and stage base that constitute the stage apparatus 100.

FIG. 2 is a view showing the outer appearances of the x stage 110, y stage 120, and stage base 130 that constitute the stage apparatus 100.

X-axis cross roller guides 111a paired with x-axis cross roller guides 111b arranged on the y stage 120 are arranged on the x stage 110. Y-axis cross roller guides 121b paired with y-axis cross roller guides 121a arranged on the y stage 120 are arranged on the stage base 130. The two x-axis cross roller guides 111a are arranged to sandwich the two x-axis cross roller guides 111b from the outside, and the two y-axis cross roller guides 121a are arranged to sandwich the two y-axis cross roller guides 121b from the outside. The x stage 110 can move in the x-axis direction on the surface of the y stage 120 by fixing the x-axis cross roller guides 111a and 111b in a state in which cross rollers are inserted between them. Similarly, the y stage 120 can move in the y-axis direction on the surface of the stage base 130 by inserting cross rollers between the y-axis cross roller guides 121a and 121b and fixing them.

A driving mechanism configured to move the x stage 110 in the x direction with respect to the y stage, and a driving mechanism configured to move the y stage 120 in the y direction with respect to the stage base 130 are mounted on the y stage 120. A manual driving mechanism 170 drives a driven portion (a wire connected to the x stage in this embodiment) configured to move the x stage 110 in the x direction with respect to the y stage 120 by a manual driving force. Similarly, the manual driving mechanism 170 drives a driven portion (a wire connected to the stage base 130 in this embodiment) configured to move the y stage 120 in the y direction with respect to the stage base 130. More specifically, the turning operations of the x knob 161 and y knob 162 are converted into the moving operations of an x wire 173 and y wire 174 respectively, which will be described in more detail with reference to FIG. 4 and subsequent drawings. The x stage 110 moves in the x direction with respect to the y stage 120 by movement of the x wire 173, and the y stage 120 moves in the y direction with respect to the stage base 130 by movement of the y wire 174. The y wire 174 corresponds to an example of the first driven portion. The x wire 173 corresponds to an example of the third driven portion.

A linear actuator 200x for the x direction is a linear actuator that provides a driving force to move the x stage 110 in the x direction with respect to the y stage 120. A linear actuator 200y for the y direction is a linear actuator that provides a driving force to move the y stage 120 in the y direction with respect to the stage base 130. The linear actuators 200x and 200y have the same structure and will be described as the linear actuator 200 when referred to generically. When the linear actuator 200 is described distinctively as a linear actuator for the x or y direction, x or y is suffixed to the end of the reference numeral.

Figure 3A:
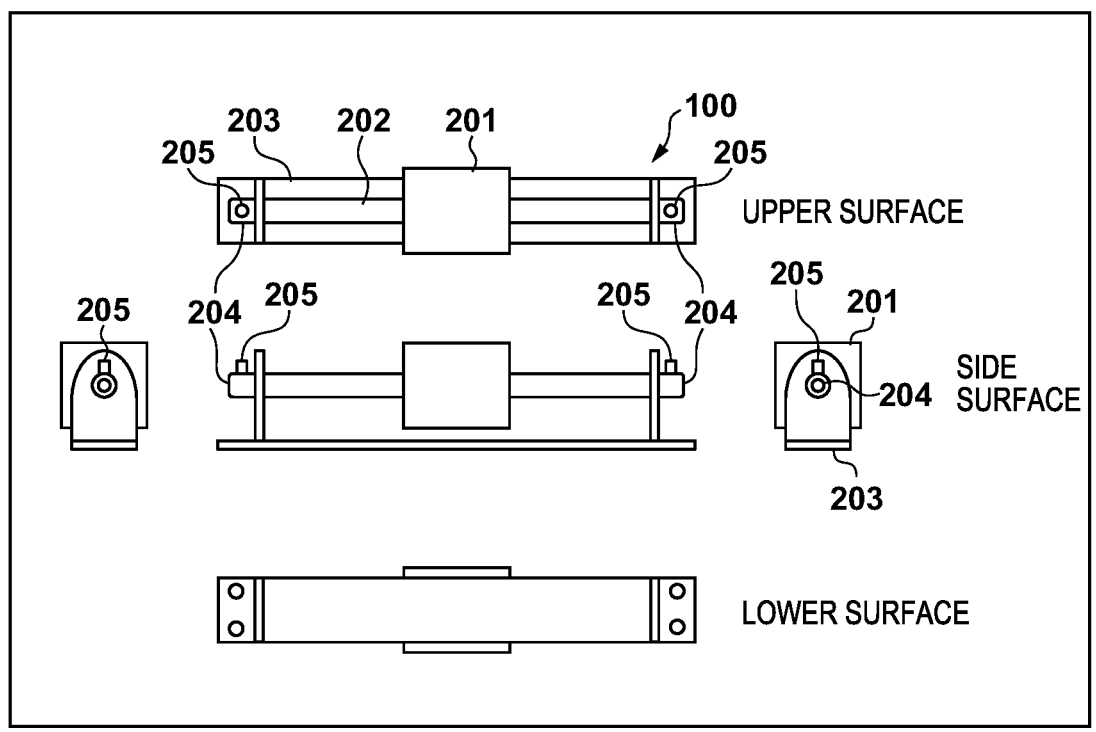
FIGS. 3A, 3B, 3C, and 3D are views for explaining an example of the structure of a linear actuator.
Figure 3B:
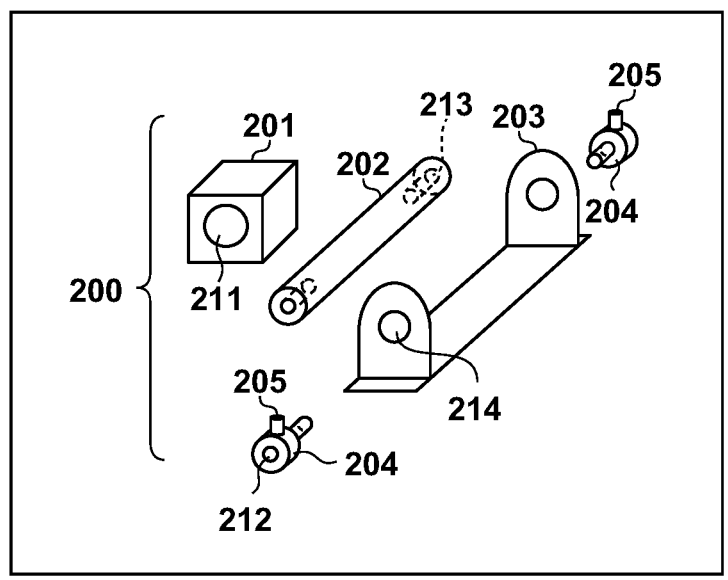
Figure 3C:
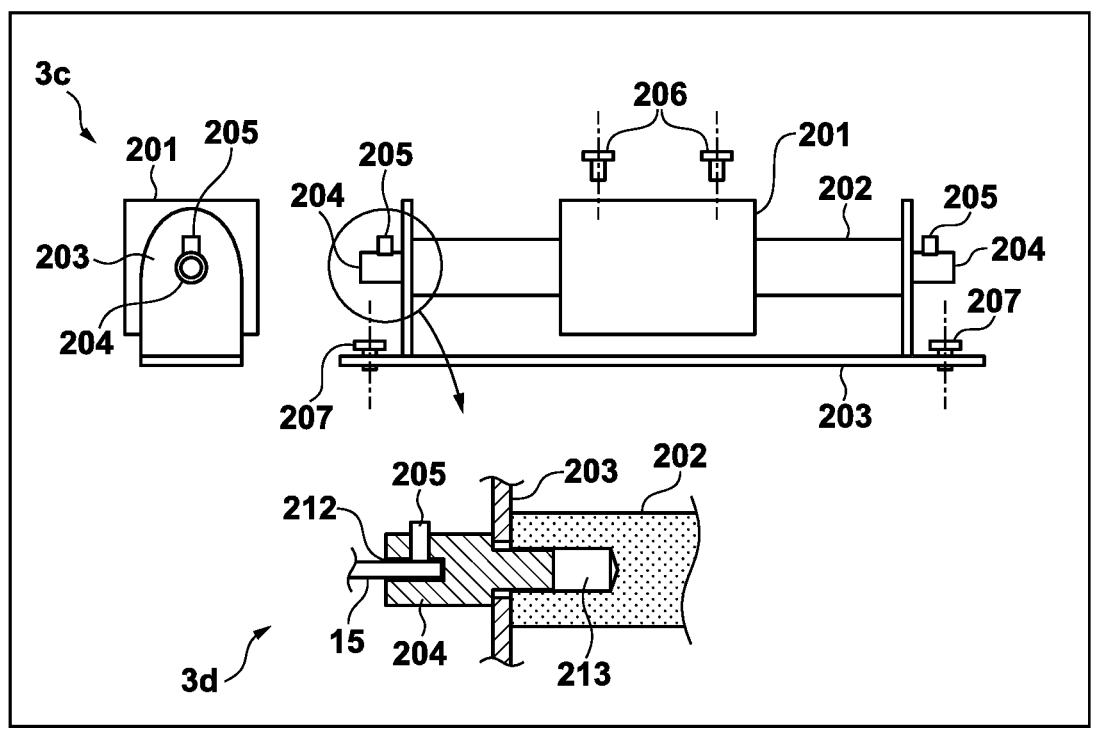
Figure 3D:
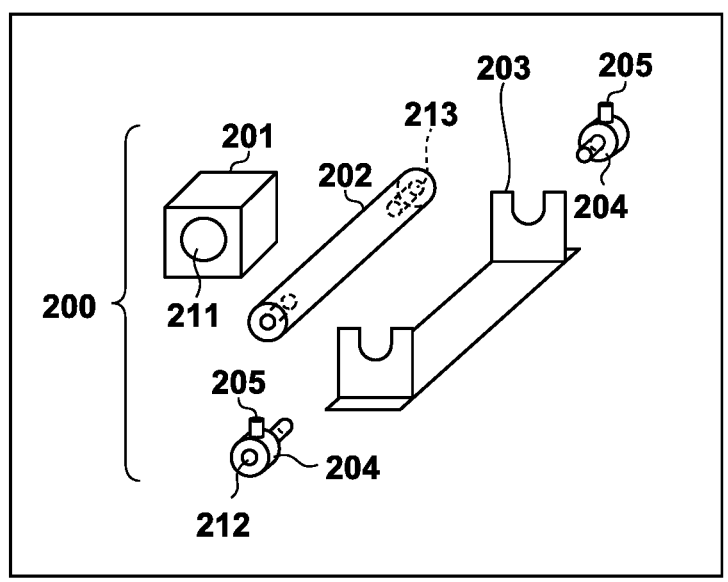

FIGS. 3A to 3D are views for explaining the structure of the linear actuator 200 according to this embodiment. FIG. 3A is a view showing the top, front, bottom, and sides of the linear actuator 200. FIGS. 3B and 3D are exploded perspective views showing the components of the linear actuator 200. In FIG. 3C, 3c is a view for explaining attachment of the linear actuator 200. In FIG. 3C, 3d is a view showing the section of part of 3c. The linear actuator 200 according to this embodiment uses a so-called shaft motor (a linear motor using a shaft) formed from a jacket member 201 and a shaft 202 inserted into a hole extending through the jacket member 201. That is, the shaft 202 is inserted into a through hole 211 of the jacket member 201 of the shaft motor. In this state, the shaft 202 is fixed using wire connecting portions 204 to large holes 214 formed in a frame 203. When mounting the stage apparatus 100, the shaft 202 is fixed to the frame 203 by the wire connecting portions 204 so that a driving wire 15 (the x wire 173 or the y wire 174 which will be described in more detail with reference to FIG. 4 and subsequent drawings) becomes coaxial with the shaft 202.

As a result of this mounting, the linear actuator 200 as shown in FIGS. 3A and 3B is constituted. As shown in the drawings, the linear actuator 200 includes the jacket member 201, the shaft 202 slidably inserted into the through hole 211 of the jacket member 201, and the wire connecting portions 204 that fix the shaft 202 to the frame 203 and provide wire connecting mechanisms for connecting the driving wire. One of the jacket member 201 and the shaft 202 has a coil and the other has a magnet. By energizing the member having the coil, the member including the magnet moves relatively to the coil. That is, in the linear actuator 200 according to this embodiment that provides an electromotive driving force, a so-called shaft motor (a linear motor using a shaft) formed from the jacket member 201 and the shaft 202 inserted into the hole extending through the jacket member 201 is fixed to the frame 203 at the time of mounting. In the linear actuator 200, the shaft 202 operates in the longitudinal direction (axial direction) in response to application of an electrical signal.

The shaft 202 has a circular section and is assembled into the frame 203 at the time of mounting in a state in which the shaft 202 is inserted into the through hole 211 of the jacket member 201. The two end portions of the shaft 202 are fixed to the frame 203 by the wire connecting portions 204. As shown in FIG. 3C, a screw portion corresponding to a screw portion 213 provided at each end portion of the shaft 202 is provided at one end of each wire connecting portion 204, and a hole portion 212 for fixing a wire is provided at the other end. The driving wire (the x wire 173 or the y wire 174 to be described later) is inserted into the hole portions 212 and tightened from the radial direction by wire fixing screws 205, thereby connecting the driving wire substantially coaxially with the shaft 202. "Coaxial" means a state in which the center axis of the driving wire coincides with that of the shaft 202. Note that FIGS. 3A to 3C show a form in which the driving wire is fixed to the hole portions 212 by the wire fixing screws 205, but the method of fixing the driving wire is not limited to this. Any structure may be employed as long as the driving wire can be fixed coaxially with the shaft 202. For example, the driving wire may be fixed to the hole portions 212 by caulking. It is also possible to insert the end portion of the driving wire into the cylindrical hole of a cylindrical pin having the cylindrical hole at one end, fix the cylindrical pin to the end portion of the driving wire by a screw or caulking, insert the other end of the cylindrical pin into the hole portion 212, and fix it by the wire fixing screw 205.

The jacket member 201 is fixed to they stage 120 by jacket member fixing screws 206 directly or indirectly via attaching members. The frame 203 is fixed to the x stage 110 or the stage base 130 by frame fixing screws 207 directly or indirectly via attaching members. In this arrangement, the frame 203x of the linear actuator 200x for the x direction is fixed to the x stage 110. When the shaft 202x moves in the x direction with respect to the jacket member 201x, the x stage 110 moves in the x direction with respect to the y stage 120. Similarly, the frame 203y of the linear actuator 200y for the y direction is fixed to the stage base 130. When the shaft 202y moves in they direction with respect to the jacket member 201y, they stage 120 moves in the y direction with respect to the stage base 130. The jacket member 201y corresponds to an example of the second driving means and the shaft 202y corresponds to an example of the second driven means. The jacket member 201x corresponds to an example of the fourth driving means and the shaft 202x corresponds to an example of the fourth driven means.

The distribution form of the linear actuator 200 according to this embodiment and attachment to the stage apparatus 100 are not limited to the above-described form. For example, portions for fixing the jacket member 201 and the shaft 202 may be provided on a stage to which they are attached. Alternatively, as shown in FIG. 3D, the shaft 202 having the wire connecting portions 204 at two ends may be inserted into large U-grooves formed in the frame 203 and be fixed. In this manner, any arrangement may be used as long as the wire for manual driving and the shaft 202 for electromotive driving are mounted on the stage apparatus so that the wire and the shaft 202 become coaxial with each other and the axial direction becomes parallel to the moving direction of the stage. It suffices to connect the wire for manual driving coaxially with the shaft 202 at a position on the extension of the axis of the shaft 202. For example, the wire for manual driving may not be connected to the two ends of the shaft 202 as in a linear actuator to be described later with reference to FIGS. 17A and 17B.

Figure 4:
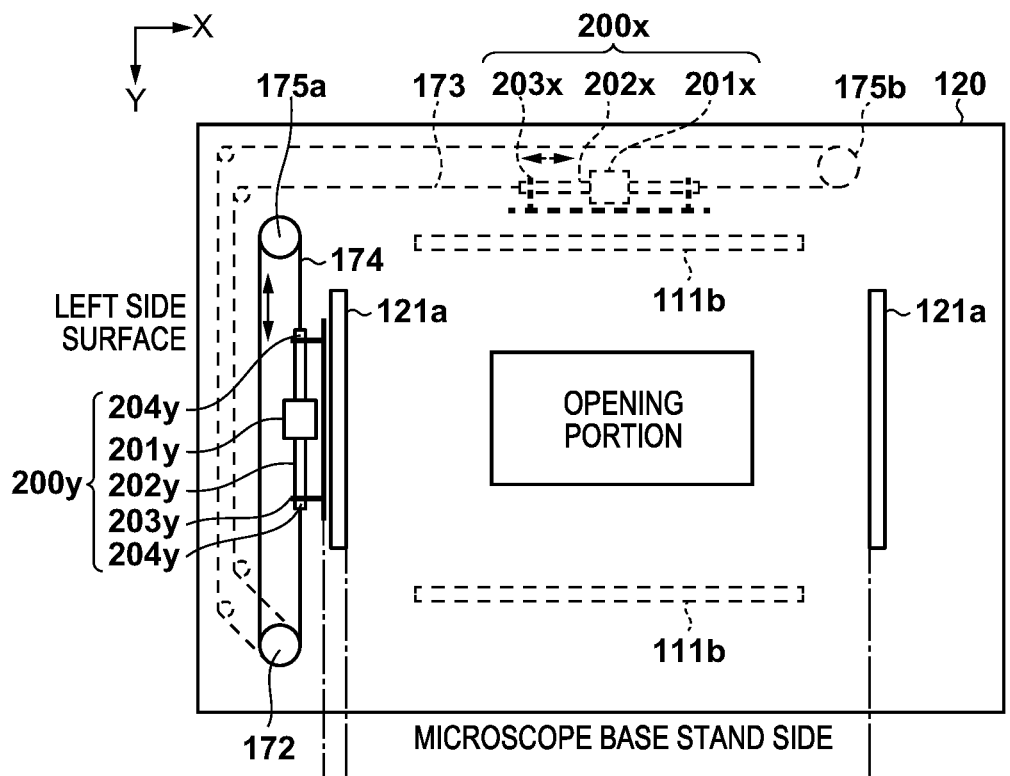
FIG. 4 is a view showing an example of the arrangement of components on the lower surface of the y stage and the upper surface of the stage base.
Figure 4:
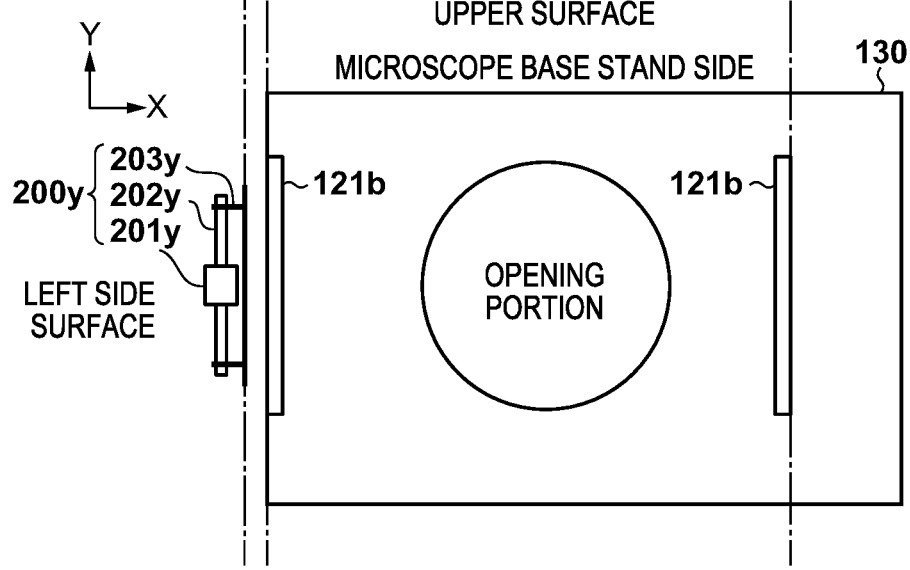

FIG. 4 is a view schematically showing the arrangement of components regarding stage driving on the lower surface of the y stage 120 and the upper surface of the stage base 130. Since FIG. 4 is a schematic view for explaining the arrangement of components, the size, position, and shape of an opening portion formed in the stage, the arrangement positions and sizes of respective components, and the like do not always coincide with those in the view of the arrangement of the stage shown in FIG. 2.

The y-axis cross roller guides 121a and the jacket member 201y of the linear actuator 200y are fixed to the lower surface of the y stage 120. The y wire 174 is looped between a y pulley 172 and a pulley 175a. The linear actuator 200y is disposed so that the y wire 174 and the shaft 202y become coaxial with each other. The y wire 174 is connected to the wire connecting portions 204y. The y pulley 172 rotates in accordance with a manual operation to the y knob 162, and the y wire 174 operates in response to the rotation of the y pulley 172. The shaft 202y is fixed to the frame 203y. The frame 203y is fixed to the stage base 130 (via a bracket (not shown) if necessary). The y-axis cross roller guides 121b are arranged on the upper surface of the stage base 130. The y-axis cross roller guides 121a are configured to sandwich the y-axis cross roller guides 121b, and the y stage 120 can move in the y direction with respect to the stage base 130.

In the above-described arrangement, when the shaft 202y is moved in the y direction with respect to the jacket member 201y, they stage 120 moves in the y direction (along the y-axis cross roller guides 121) with respect to the stage base 130. The linear actuator 200y moves the shaft 202y in response to energization to the coil of the jacket member 201y and can move the y stage 120 in the y direction with respect to the stage base 130 by the driving force of the linear actuator 200y. A turning force by manipulation of the y knob 162 is converted into a rotational force for the y pulley 172 in the manual driving mechanism 170 and the y wire 174 is moved. Since the y wire 174 is connected to the stage base 130 via the wire connecting portions 204 and the frame 203y, the movement of the y wire 174 moves the stage base 130 relatively in the y direction with respect to the y stage 120. As a result, the y stage 120 moves in the y direction with respect to the stage base 130.

Figure 5:
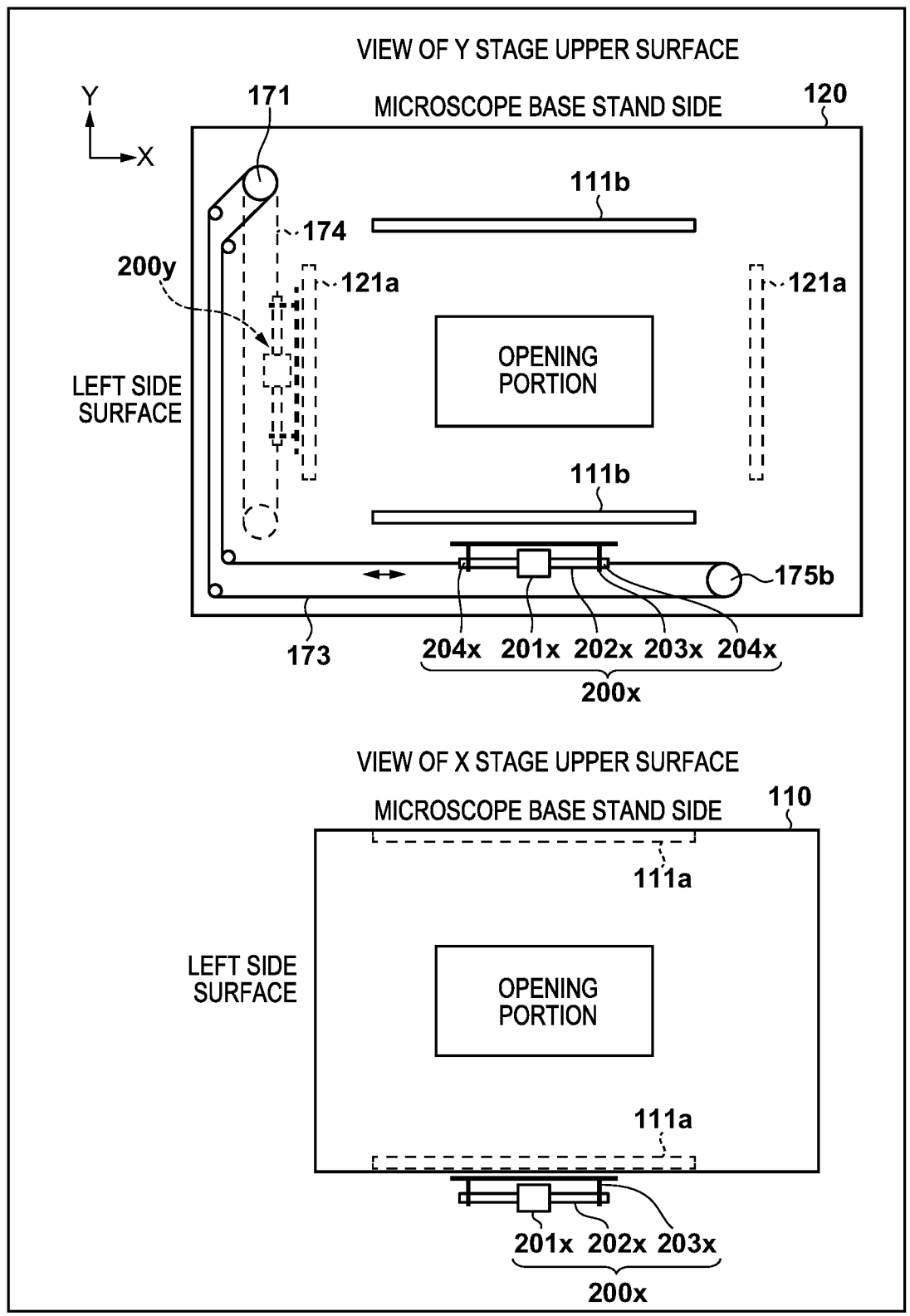
FIG. 5 is a view showing an example of the arrangement of components on the upper surface of the y stage and the upper surface of the x stage.

FIG. 5 is a view schematically showing the arrangement of components regarding stage driving on the upper surface of the y stage 120 and the x stage 110. Since FIG. 5 is a schematic view for explaining the arrangement of components, similar to FIG. 4, the size, position, and shape of an opening portion formed in the stage, the arrangement positions and size of respective components, and the like do not always coincide with those in the view of the arrangement of the stage shown in FIG. 2.

The x-axis cross roller guides 111b and the jacket member 201x of the linear actuator 200x are fixed to the upper surface of the y stage 120. The x wire 173 is looped between an x pulley 171 and a pulley 175b. The linear actuator 200x is disposed so that the x wire 173 and the shaft 202x become coaxial with each other. The x wire 173 is connected to the wire connecting portions 204x. The x pulley 171 rotates in accordance with a manual operation to the x knob 161, and the x wire 173 operates in response to the rotation of the x pulley 171. The shaft 202x is fixed to the frame 203x. The frame 203x is fixed to the x stage 110 (via a bracket (not shown) if necessary). The x-axis cross roller guides 111a are arranged on the lower surface (a surface facing the upper surface of the y stage 120) of the x stage 110. The x-axis cross roller guides 111a are configured to sandwich the x-axis cross roller guides 111b, and the x stage 110 can move in the x direction with respect to the y stage 120.

In the above-described arrangement, when the shaft 202x is moved in the x direction with respect to the jacket member 201x, the x stage 110 moves in the x direction (along the x-axis cross roller guides 111) with respect to the y stage 120. The linear actuator 200x moves the shaft 202x in response to energization to the coil of the jacket member 201x and can move the x stage 110 in the x direction with respect to the y stage 120 by the driving force of the linear actuator 200x. A turning force by manipulation of the x knob 161 is converted into a rotational force for the x pulley 171 in the manual driving mechanism 170 and the x wire 173 is moved. The wire connecting portions 204 coaxially connected to the x wire 173 and the frame 203x also move in the x direction in accordance with the movement of the x wire 173, and the x stage 110 on which the frame 203x is fixed moves. Resultantly, the x stage 110 is manually moved in the x direction with respect to the y stage 120.

In the stage apparatus 100 according to this embodiment, the shaft 202x of the linear actuator 200x and the x wire 173 are coaxial with each other. For this reason, the operating axis of the shaft 202x serving as a driven portion that operates in accordance with an electromotive driving force, and the operating axis of the x wire 173 that operates in accordance with a manual driving force become common at least partially. The common operating axis is parallel to the x direction defined by the x-axis cross roller guides 111. By making the operating axes in electromotive driving and manual driving coincide with each other, generation of a slight movement of the x stage 110 can be reduced upon switching between electromotive driving and manual driving. The observer of a microscope can switch between electromotive driving and manual driving at an arbitrary timing without any stress. As for the y stage 120 and the stage base 130, the shaft 202y of the linear actuator 200y and the y wire 174 are arranged coaxially, so generation of a slight movement of they stage 120 can be reduced upon switching between electromotive driving and manual driving. Note that the manual driving mechanism 170 executes the switching between electromotive driving and manual driving, and this arrangement will be described below with reference to FIGS. 14A and 14B.

Figure 6:
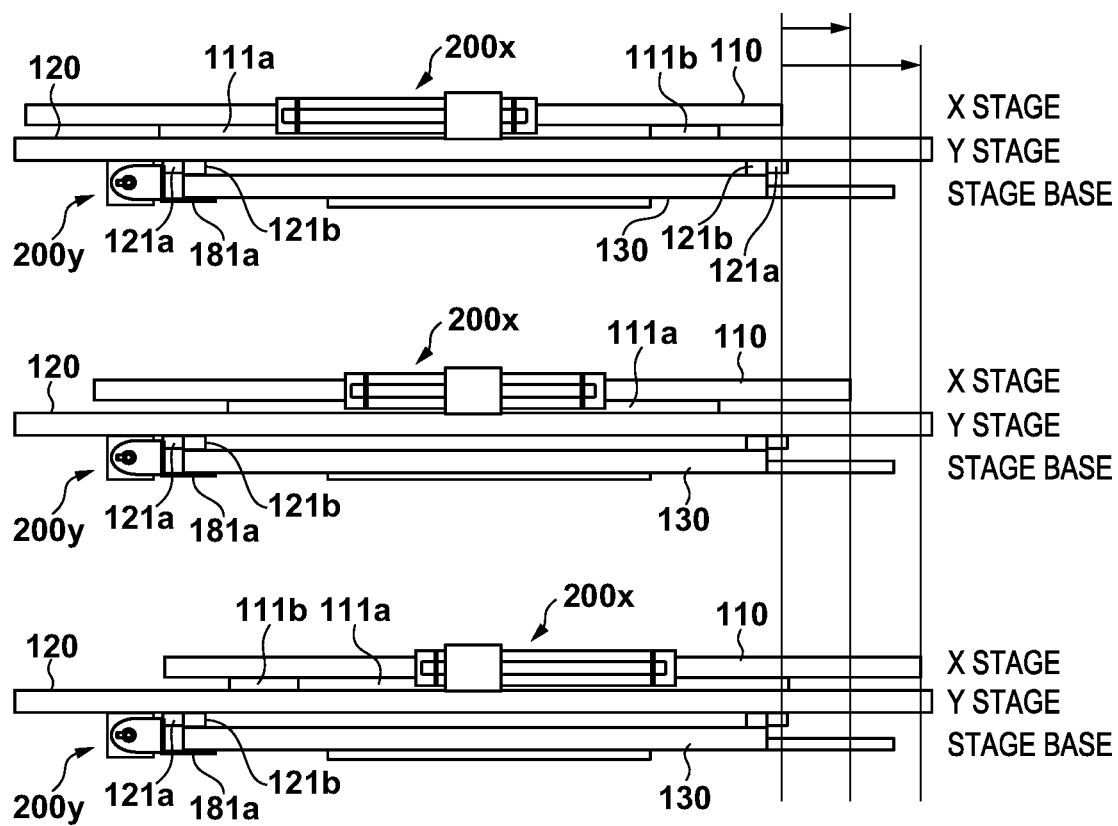
FIG. 6 is a view for explaining an example of the stacking state of the x stage, y stage, and stage base.

The stacking state of the x stage 110, y stage 120, and stage base 130 will be explained below with reference to FIG. 6. As shown in FIG. 6, the x stage 110, the y stage 120, and the stage base 130 are stacked in the z direction. The y stage 120 is stacked to be movable in the y direction on the stage base 130 by the y-axis cross roller guides 121a fixed to the lower surface of they stage 120 and the y-axis cross roller guides 121b fixed to the upper surface of the stage base 130. Similarly, the x stage 110 is stacked to be movable in the x direction on the y stage 120 by the x-axis cross roller guides 111a fixed to the lower surface of the x stage 110 and the x-axis cross roller guides 111b fixed to the upper surface of the y stage 120. FIG. 6 shows a state in which the x stage 110 is moved in the x direction with respect to the y stage 120.

The jacket member 201y of the linear actuator 200y is directly fixed to the lower surface of the y stage 120, and the frame 203y is fixed to the stage base 130 via an L-shaped bracket 181a. The frame 203y is fixed so that the bottom surface of the frame 203y becomes perpendicular to the surface of the stage base 130. This allows arranging the linear actuator 200y in a space in which the stage base 130 and they stage 120 are restricted in the direction of height.

[Modifications of Attachment of Linear Actuator 200y]

Figure 7A:
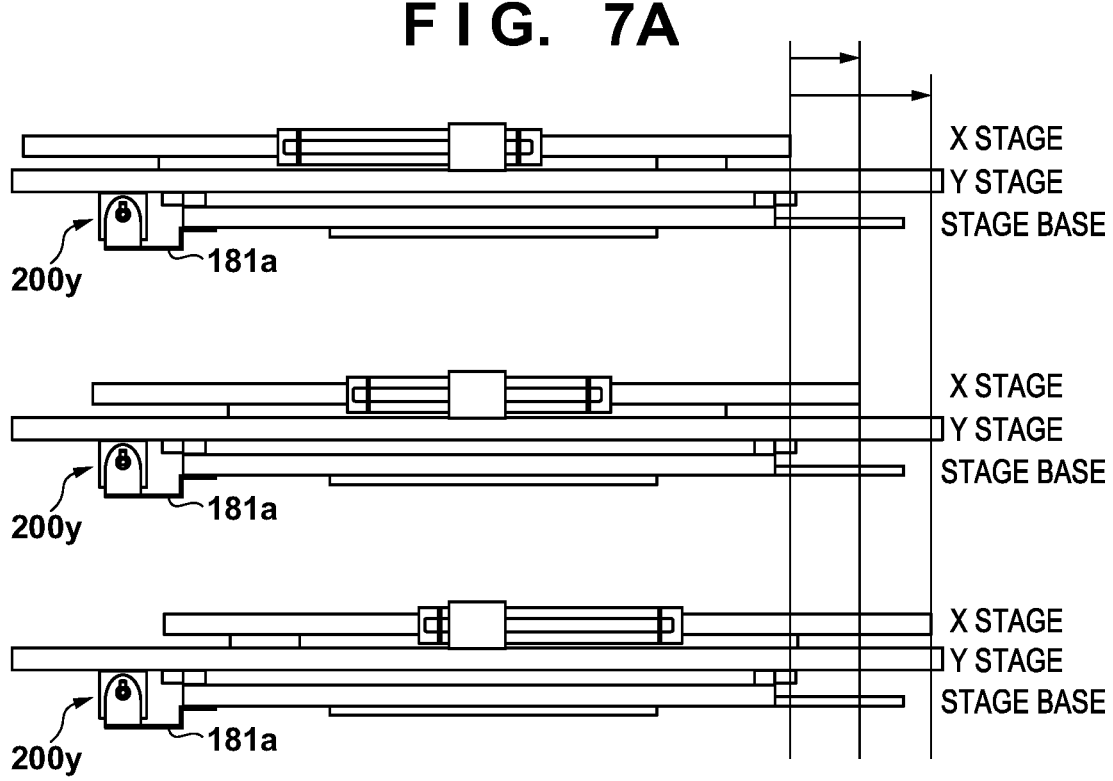
FIGS. 7A and 7B are views showing modifications regarding attachment of the frame of the linear actuator.
Figure 7B:
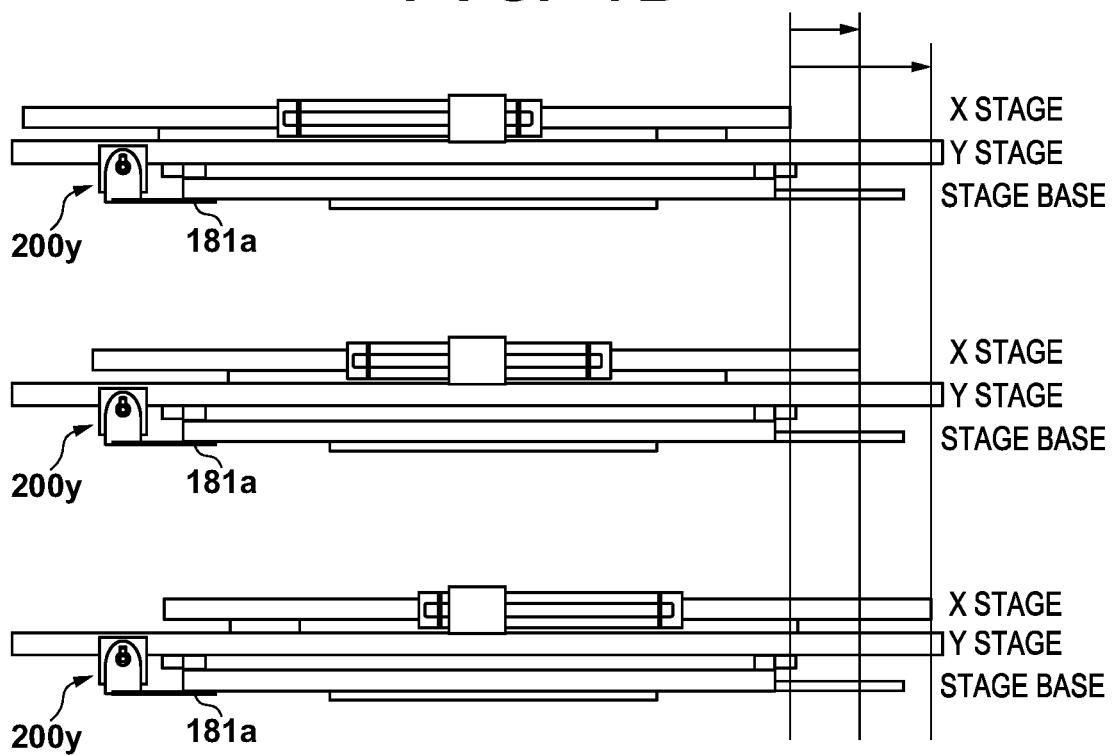

The method of attaching the linear actuator 200y (the frame 203y) to the stage base 130 by the bracket 181a is not limited to this. FIGS. 7A and 7B show modifications of the arrangement of attaching the frame 203y to the stage base 130. In FIG. 7A, the frame 203y is fixed so that the bottom surface of the frame 203y becomes parallel to the surface of the stage base 130. The position in the direction of height is adjusted by forming the bracket 181a into a stepwise shape as shown in FIG. 7A. In FIG. 7B, similar to FIG. 7A, the frame 203y is fixed so that the bottom surface of the frame 203y becomes parallel to the surface of the stage base 130, but a flat plate is employed as the bracket 181a. In this case, a recessed portion is formed in the lower surface of the y stage 120 to absorb the size of the linear actuator 200y in the direction of height.

[Modification of Component Arrangement on y Stage 120]

In this embodiment, the x-axis cross roller guides 111b are arranged and the x wire 173 is laid on the upper surface of they stage 120, and the y-axis cross roller guides 121a are arranged and the y wire 174 is laid on the lower surface of they stage 120. That is, the arrangement for driving the x stage 110 is provided on the upper surface of the y stage 120, and the arrangement for driving the y stage 120 with respect to the stage base 130 is provided on the lower surface. In contrast, an arrangement in which the arrangement for driving the x stage 110 in the x direction and the arrangement for driving the y stage 120 in the y direction are collected on the lower surface of the y stage 120 will be explained with reference to FIGS. 8 to 10. In this arrangement, the cross roller guides for the x and y directions are arranged on the same surface. This can further reduce the size of the stage apparatus 100 in the direction of height in assembly, that is, further decrease the thickness of the stage apparatus 100.

Figure 8:
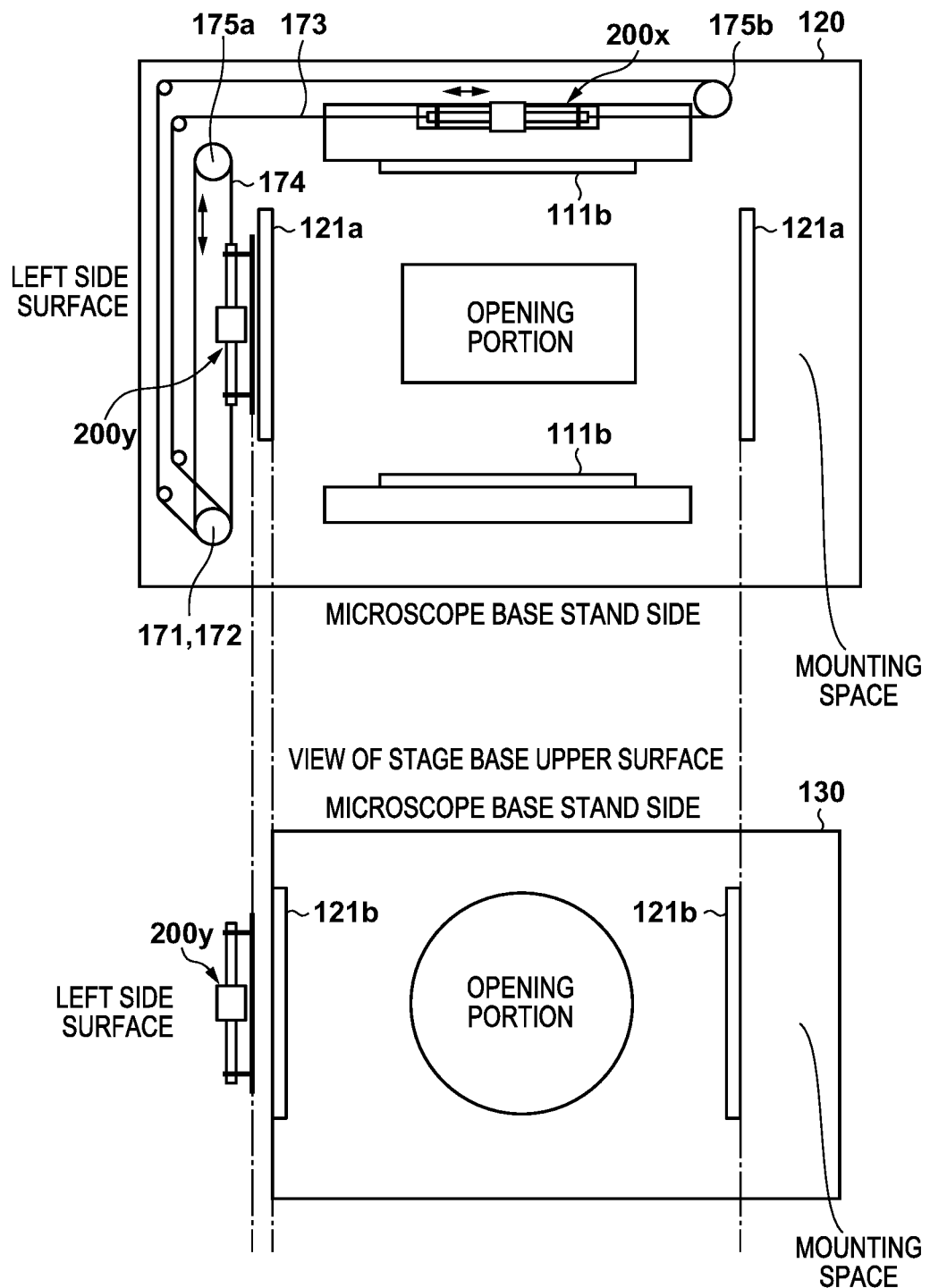
FIG. 8 is a view showing an example of the arrangement of components on the y stage according to a modification.

FIG. 8 is a view schematically showing the arrangement of components regarding stage driving on the lower surface of the y stage 120 and the upper surface of the stage base 130. Since FIG. 8 is a schematic view for explaining the arrangement of components, the size, position, and shape of an opening portion formed in the stage, the arrangement positions and sizes of respective components, and the like do not always coincide with those in the view of the arrangement of the stage shown in FIG. 2.

The y-axis cross roller guides 121a and the jacket member 201y of the linear actuator 200y are fixed to the lower surface of the y stage 120. The y wire 174 is looped between the y pulley 172 and the pulley 175a. The linear actuator 200y is disposed so that the y wire 174 and the shaft 202y become coaxial with each other. The y wire 174 is connected to the wire connecting portions 204y. Further, the x-axis cross roller guides 111b are fixed to the lower surface of the y stage 120. The jacket member 201x of the linear actuator 200x is fixed to the y stage 120 via a bracket (not shown). The x pulley 171 is arranged to coaxially overlap the y pulley 172 in the vertical direction (the z direction). The x wire 173 is looped between the x pulley 171 and the pulley 175b. The linear actuator 200x is disposed so that the x wire 173 and the shaft 202x become coaxial with each other. The x wire 173 is connected to the wire connecting portions 204x.

As described with reference to FIG. 4, the frame 203y that holds the shaft 202y in the linear actuator 200y for driving the y stage 120 in the y direction is fixed to the stage base 130 via, for example, the bracket 181a. The y-axis cross roller guides 121b are arranged on the upper surface of the stage base 130. The y-axis cross roller guides 121a are configured to sandwich the y-axis cross roller guides 121b, and the y stage 120 can move in they direction with respect to the stage base 130. When the shaft 202y is driven in the y direction, the y stage 120 moves in the y direction with respect to the stage base 130.

Figure 9:
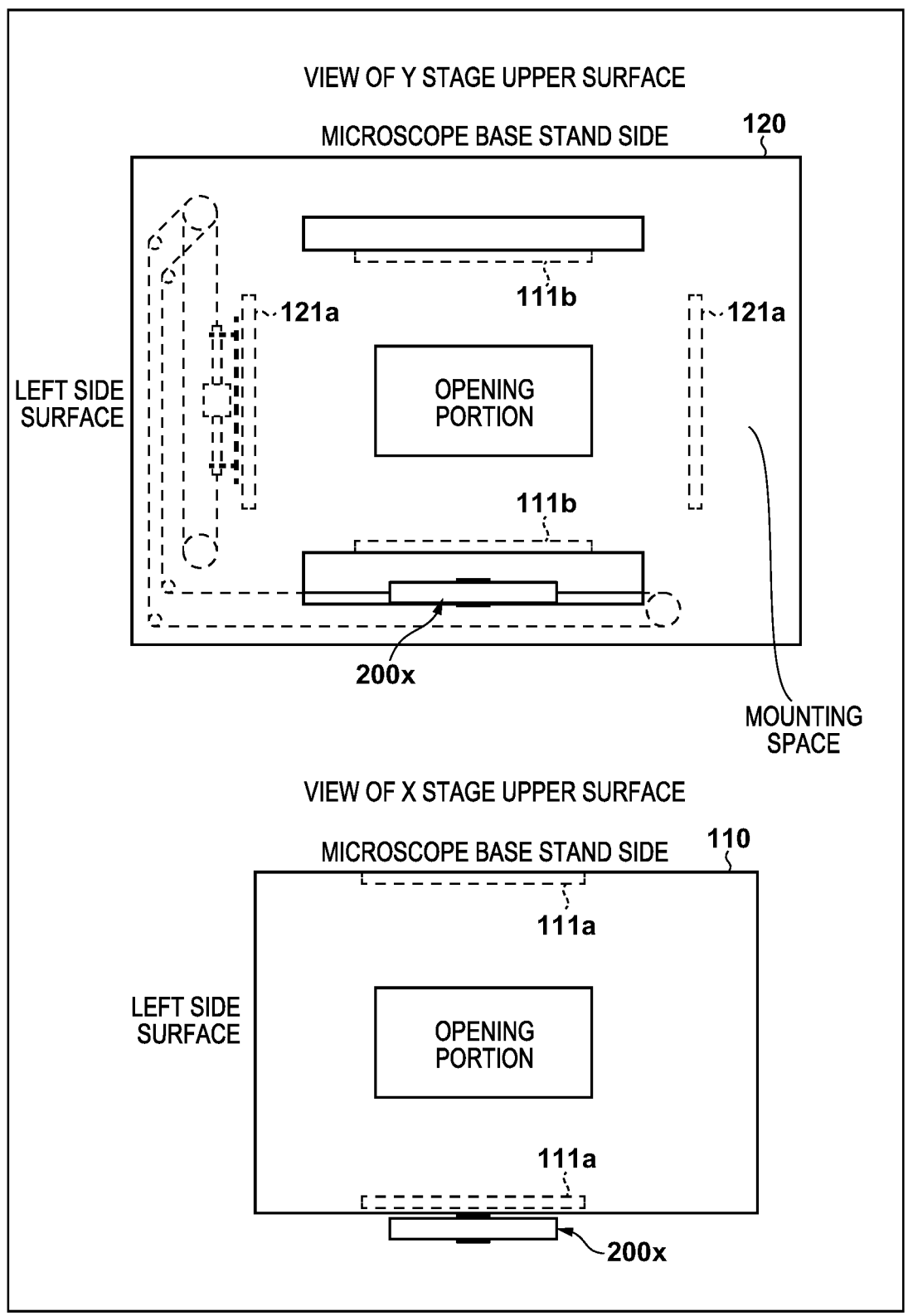
FIG. 9 is a view showing an example of the arrangement of components on the y stage according to the modification.

FIG. 9 is a view showing the upper surface of the y stage 120. Components for stage driving are arranged on the lower surface of the y stage 120, as shown in FIG. 8, so no component is arranged on the upper surface of the y stage 120. The interval between the y stage 120 and the x stage 110 can be narrowed and the size of the stage apparatus 100 in the direction of height can be reduced. The two x-axis cross roller guides 111a are fixed to the x stage 110 via brackets (not shown) so as to sandwich the two x-axis cross roller guides 111b fixed to the y stage 120 from the outside. Accordingly, the x stage 110 is stacked to be movable in the x direction with respect to the y stage 120. Since the x-axis cross roller guides 111a are fixed to the x stage 110 via the brackets, openings for receiving the brackets are formed along the x-axis cross roller guides 111b in they stage 120.

Figure 10:
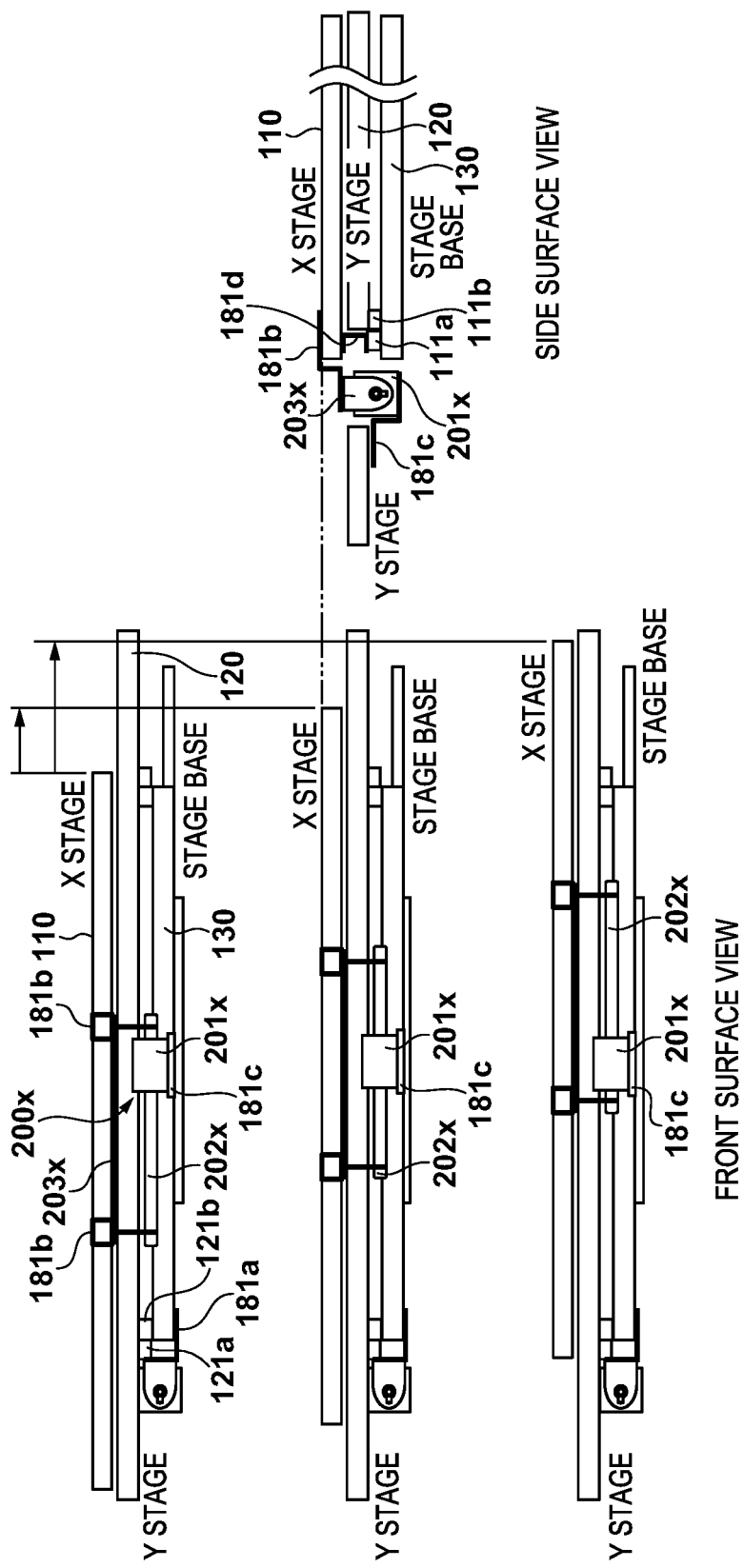
FIG. 10 is a view for explaining an example of the stacking state of the x stage, y stage, and stage base.

FIG. 10 is a view showing the stacking state of the x stage 110, y stage 120, and stage base 130. The x-axis cross roller guides 111 do not exist between the x stage 110 and the y stage 120, and the thickness of the stage apparatus 100 in the z direction is smaller than that in the structure shown in FIG. 6. To coaxially connect the x wire 173 laid on the lower surface of the y stage 120 and the shaft 202x of the linear actuator 200x, the position of the shaft 202x needs to be lower than the lower surface of the y stage 120. Hence, the frame 203x is fixed to the x stage 110 via brackets 181b. To make the x-axis cross roller guides 111b fixed to the lower surface of the y stage 120 face the x-axis cross roller guides 111a, the x-axis cross roller guides 111a are fixed to the x stage 110 via brackets 181d. Note that the brackets 181d may be integrated with the mechanism of the x stage 110 in order to firmly hold the cross roller guides. A bracket 181c is configured to fix the jacket member 201x of the linear actuator 200x for the x direction to they stage 120. The z position of the jacket member 201 is adjusted to match the position of the shaft 202x.

In the stage apparatus 100 according to each of the embodiment and its modifications, the stage base 130 supports the y stage 120 slidably in the y direction, and they stage 120 supports the x stage 110 slidably in the x direction. The stage base 130 is fixed to the z base (not shown) of the microscope base stand of the microscope and does not move in the x and y directions. The y-axis cross roller guides 121b disposed on the stage base 130 stationary in the x and y directions, the y-axis cross roller guides 121a disposed on the y stage 120, and the cross rollers inserted between them constitute a sliding mechanism in the y direction. Sliding axes are intermediate lines in the y-axis direction between 121b and 121a, and two parallel intermediate lines in the y-axis direction are fulcrums (stays) at which the stage base 130 supports the y stage 120. A wide fulcrum interval is advantageous because a wide article to be mounted can be supported stably.

Figure 11:
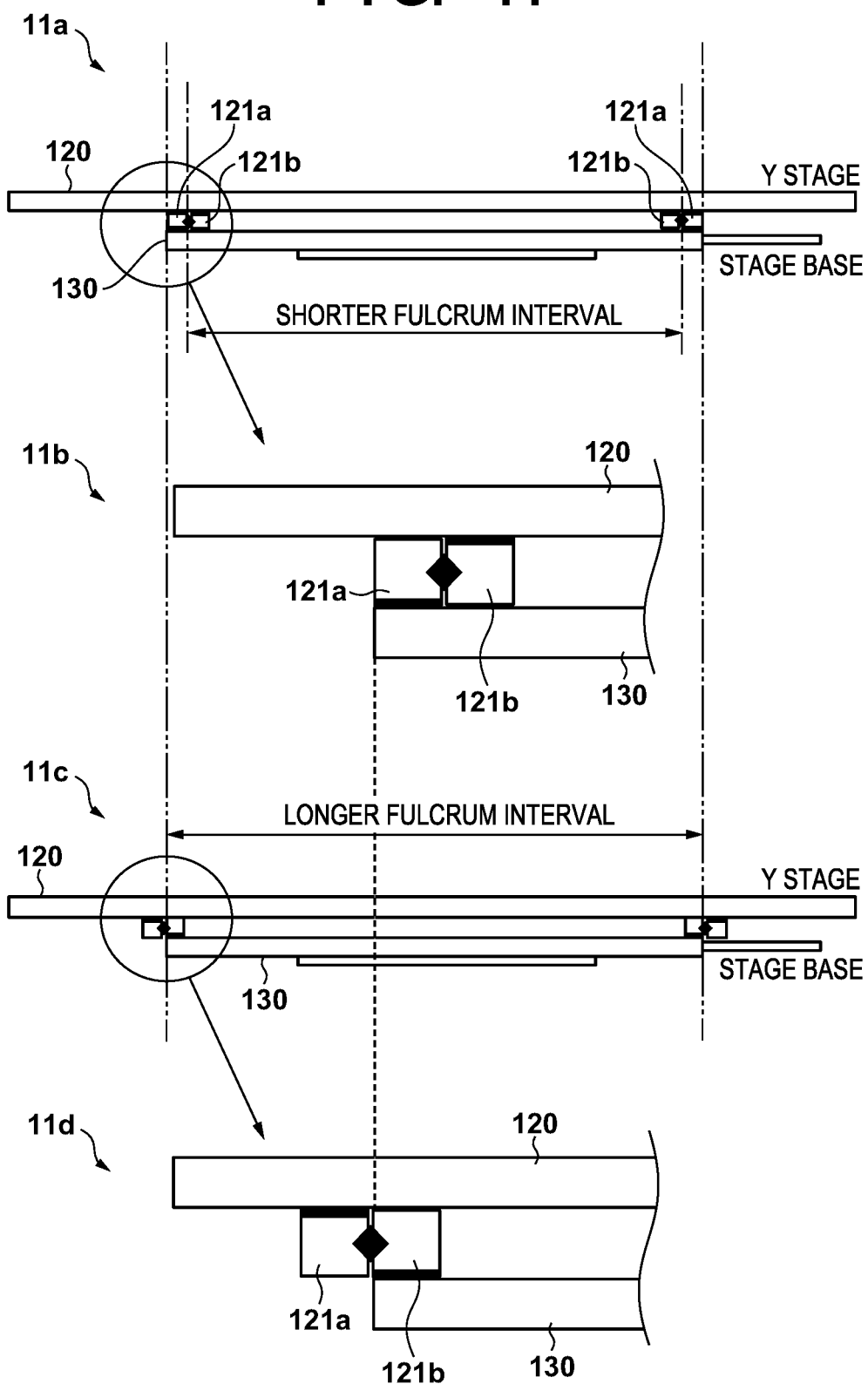
FIG. 11 is a view for explaining an example of the arrangement of inner and outer cross roller guides.

FIG. 11 is a view showing the arrangement of the cross roller guides on the y stage 120 serving as an upper stage and the stage base 130 serving as a lower stage. In FIGS. 11, 11a and 11b represent a state in which the inner y-axis cross roller guides 121b are disposed on the y stage 120 and the outer y-axis cross roller guides 121a are disposed on the stage base 130. Also, 11c and 11d represent a state in which the outer y-axis cross roller guides 121a are disposed on the y stage 120 and the inner y-axis cross roller guides 121b are disposed on the stage base 130. By using the cross roller guides of the lower stage (the stage base 130) as inner cross roller guides, as represented in 11c and 11d, the interval between the fulcrums (stays) at which the upper stage (the y stage 120) is supported becomes wider and the upper stage can be supported more stably. For this reason, in the stage apparatus 100, the y-axis cross roller guides 121b fixed to the stage base 130 serving as a lower stage are arranged inside and fixed so that recessed portions (V-grooves) for inserting the cross rollers face outward. The y-axis cross roller guides 121a fixed to they stage 120 serving as an upper stage are arranged outside and fixed so that recessed portions (V-grooves) for inserting the cross rollers face inward. This also applies to the x-axis cross roller guides 111 between the x stage 110 and the y stage 120. That is, the x-axis cross roller guides 111a fixed to the x stage 110 serving as an upper stage are arranged outside and the x-axis cross roller guides 111b fixed to the y stage 120 serving as a lower stage are arranged inside.

The assembly procedure of the cross roller guides in the stage apparatus 100 described with reference to FIGS. 8 to 10 will be described below with reference to FIGS. 12A to 12D, 13A to 13D, 14A, and 14B. As will be described below, the assembly of the cross roller guides is facilitated by disposing the x-axis cross roller guides 111 and the y-axis cross roller guides 121 on the same surface (the lower surface in FIGS. 8 to 10) of the y stage 120.

Figure 12A:
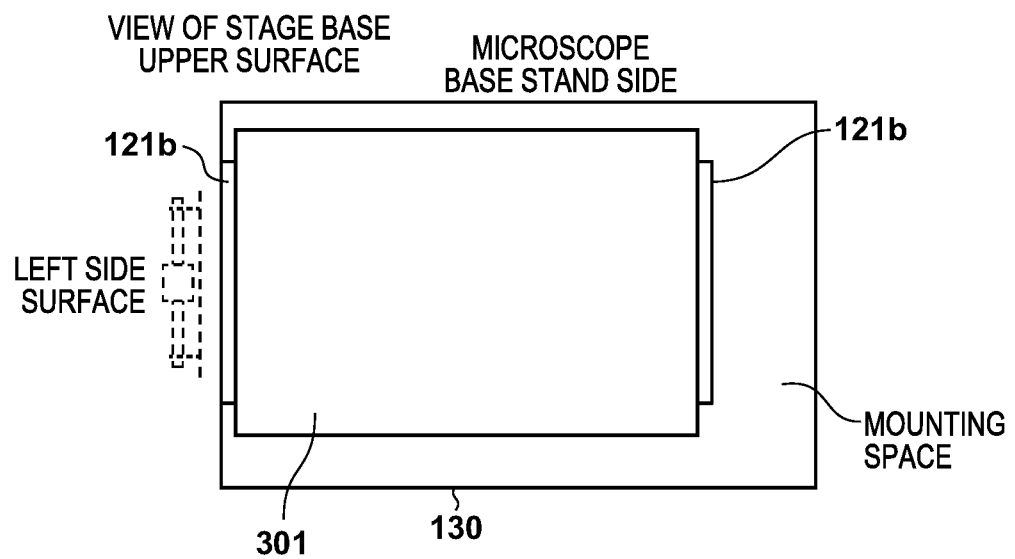
FIGS. 12A, 12B, 12C, and 12D are views for explaining an example of the assembly procedure of the cross roller guides (the stacking procedure of the stages)
Figure 12B:
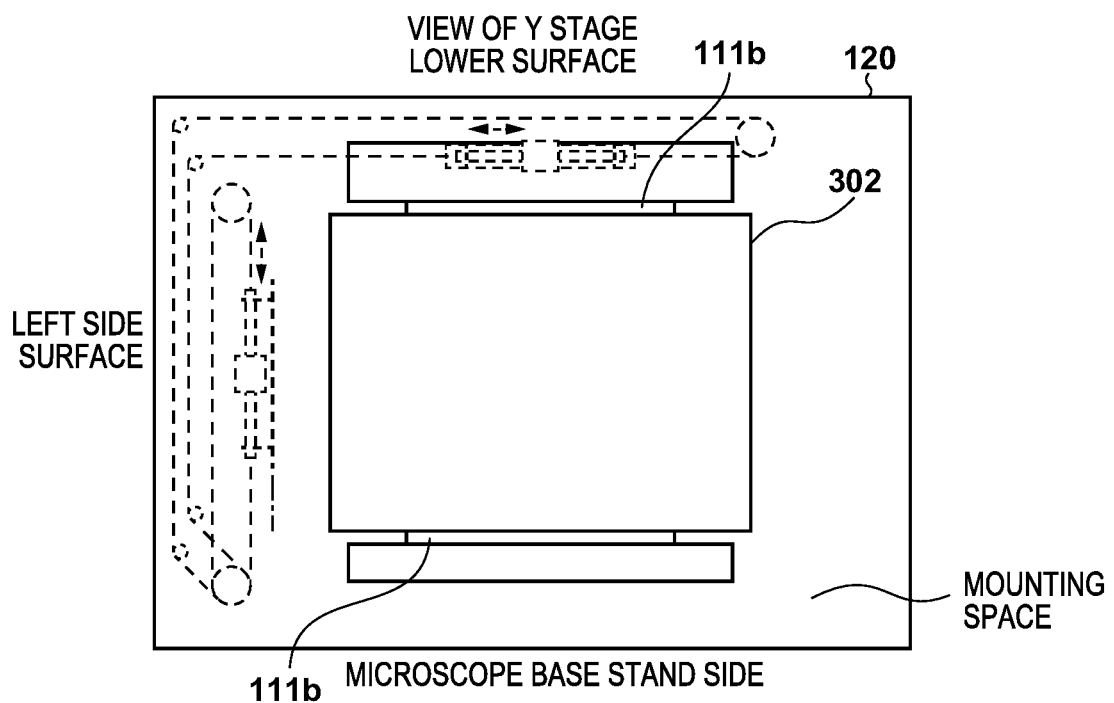

First, as shown in FIG. 12A, a pair of inner y-axis cross roller guides 121b is fixed to the upper surface of the stage base 130 so as to press a rectangular y-axis (inner) parallel jig 301 from the outside. Then, as shown in FIG. 12B, a pair of inner x-axis cross roller guides 111b is fixed to the lower surface of the y stage 120 so as to press a rectangular x-axis (inner) parallel jig 302 from the outside.

Figure 12C:
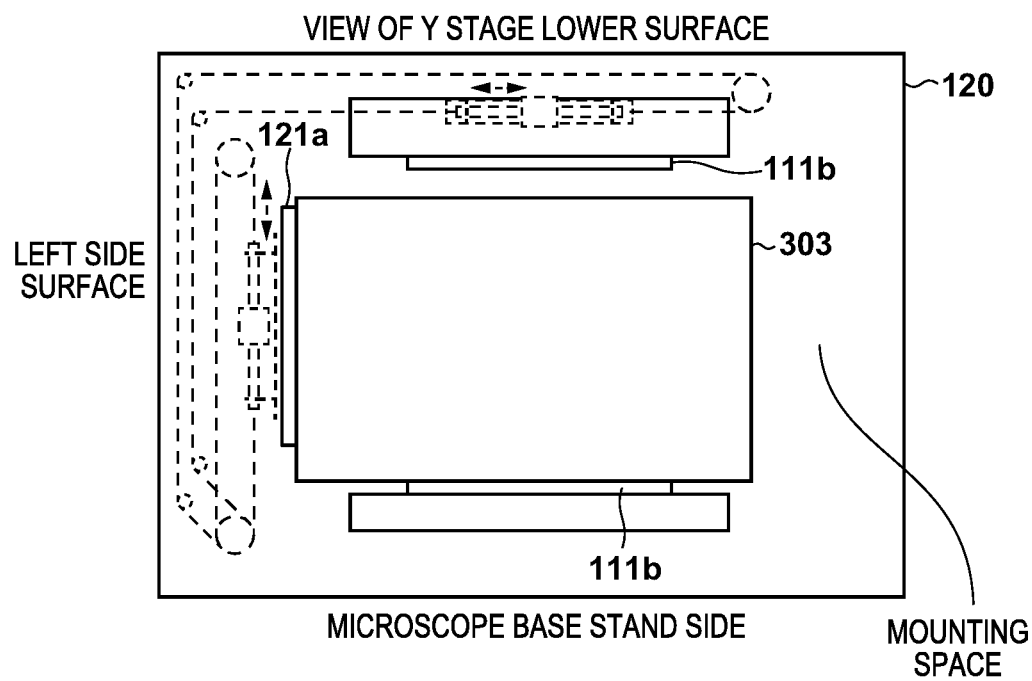

As shown in FIG. 12C, one of the two outer y-axis cross roller guides 121a is fixed to the lower surface of the y stage 120 using a right-angle jig 303. While one side of the right-angle jig 303 is pressed against one of the inner x-axis cross roller guides 111b fixed in FIG. 12B, the outer y-axis cross roller guide 121a is pressed against the other side of the right-angle jig 303 and fixed. As a result, the outer y-axis cross roller guide 121a is fixed at an angle perpendicular to the inner x-axis cross roller guide 111b.

Figure 12D:
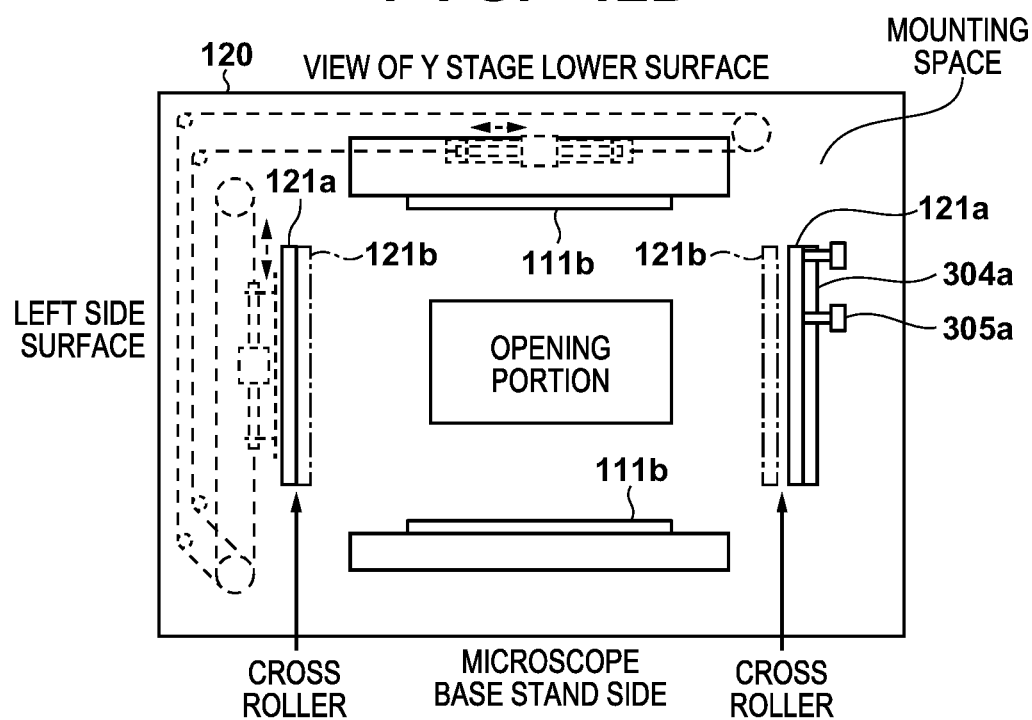

Subsequently, as shown in FIG. 12D, the other outer y-axis cross roller guide 121a is temporarily fixed, and the y stage 120 is mounted on the stage base 130 so that the pair of outer y-axis cross roller guides 121a of the y stage 120 sandwiches the pair of inner y-axis cross roller guides 121b of the stage base 130 from the outside. After that, the cross rollers are inserted into the V-grooves between the outer y-axis cross roller guides 121a and the inner y-axis cross roller guides 121b. Adjusting screws 305a of a bank 304a for adjustment are turned in a direction of tightening, thereby pushing inward the temporarily fixed outer y-axis cross roller guide 121a by a predetermined torque. In this state, the temporarily fixed y-axis cross roller guide 121a is fixed to the y stage 120. Although not shown in FIGS. 8 to 10 and the like, the bank 304a is a component necessary to push the outer y-axis cross roller guide 121a provided on the y stage 120 in the assembly and adjustment of the cross roller guides and is provided on the lower surface of the y stage 120. The bank 304a may be provided as a detachable component (jig) on the y stage 120. It is preferable to provide the adjusting screws 305a in accordance with the positions of screws (not shown) for fixing the y-axis cross roller guide 121a to the y stage 120.

Figure 13A:
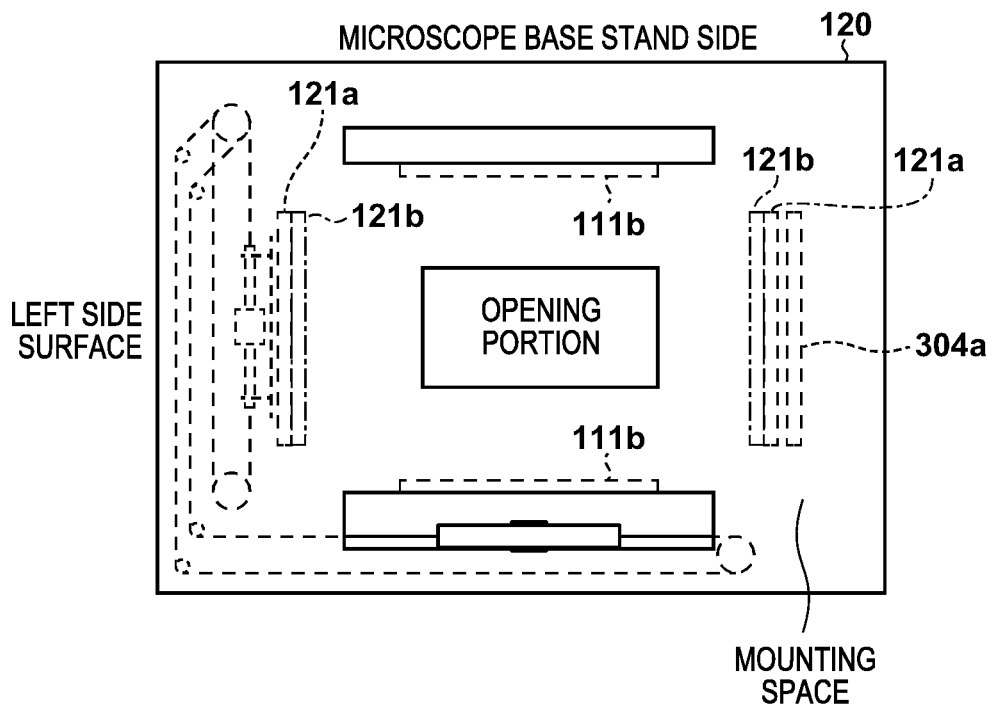
FIGS. 13A, 13B, 13C, and 13D are views for explaining an example of the assembly procedure of the cross roller guides (the stacking procedure of the stages)

As described above, the outer y-axis cross roller guides 121a to be fixed to the y stage 120 are arranged to sandwich the inner y-axis cross roller guides 121b on the stage base 130. By pushing one temporarily fixed outer y-axis cross roller guide 121a by the adjusting screws 305a at a predetermined torque, the inner y-axis cross roller guides 121b and the outer y-axis cross roller guides 121a press each other by a proper force. FIG. 13A shows this state. In this state, the y-axis cross roller guides 121a are firmly fixed to the y stage 120, completing the assembly of the y-axis cross roller guides. As described above, the bank 304a functions as a press adjusting mechanism for the cross roller guide. That is, the bank 304a applies a force to push, toward the inside of the stage, one of the outer cross roller guides whose recessed portions for inserting the cross rollers face inward. The outer cross roller guides are adjusted to a predetermined press state with respect to the inner cross roller guides whose recessed portions for inserting the cross rollers face outward. Accordingly, the cross roller guides can be fixed.

Figure 13B:
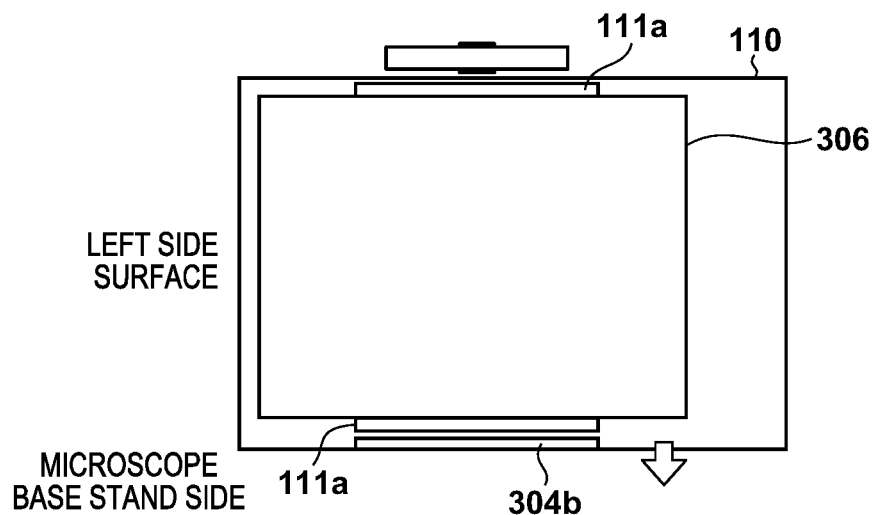
Figure 13C:
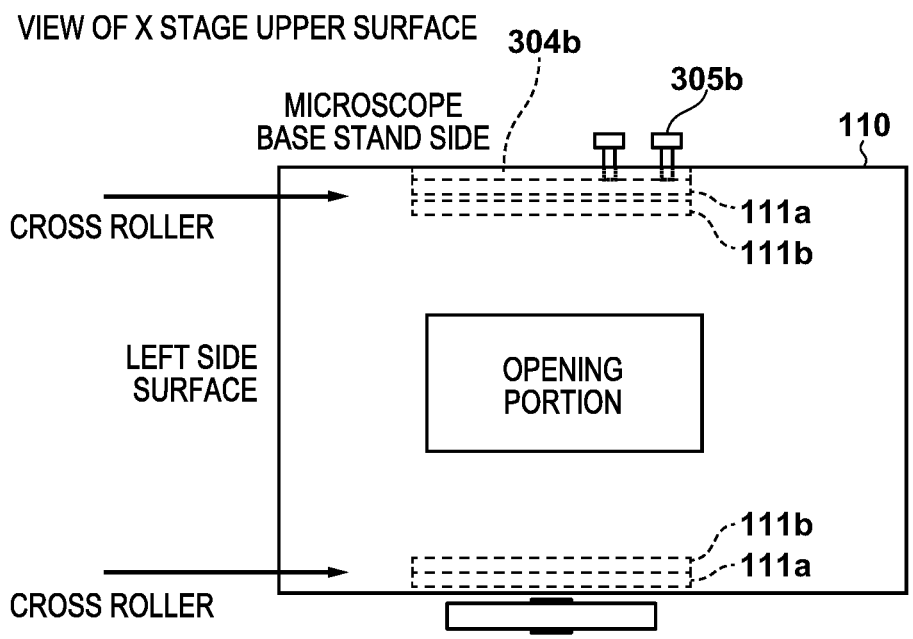

As shown in FIG. 13B, the outer x-axis cross roller guides 111a are fixed to sandwich an x-axis (outer) parallel jig 306 on the lower surface of the x stage 110. After that, one outer x-axis cross roller guide 111a for adjustment is loosened, shifted outward, and temporarily fixed. As shown in FIG. 13C, the x stage 110 is stacked on the y stage 120. As described above, the outer x-axis cross roller guides 111a to be fixed to the x stage 110 are arranged to sandwich the inner x-axis cross roller guides 111b on the y stage 120. The cross rollers are inserted into the V-grooves between the outer x-axis cross roller guides 111a and the inner x-axis cross roller guides 111b.

Figure 13D:
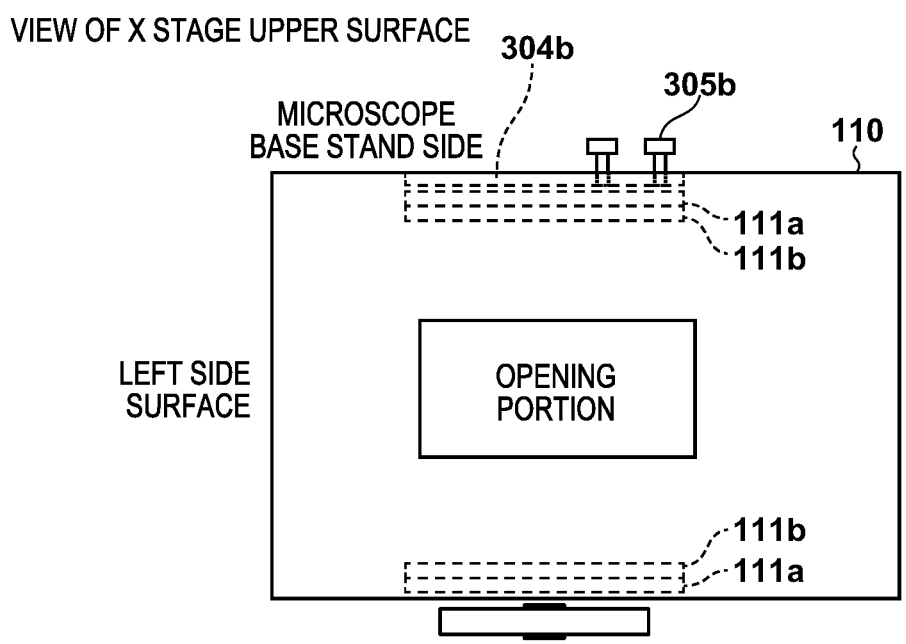

Adjusting screws 305b of a bank 304b serving as a press adjusting mechanism for the cross roller guide are turned in a direction of tightening, thereby pushing inward the temporarily fixed outer x-axis cross roller guide 111a by a predetermined torque (FIG. 13C). In this state, the temporarily fixed x-axis cross roller guide 111a is fixed to the x stage 110. Resultantly, the inner x-axis cross roller guides 111b and the outer x-axis cross roller guides 111a press each other by a proper force (FIG. 13D). Although not shown in FIGS. 8 to 10 and the like, the bank 304b is a component necessary to push the outer x-axis cross roller guide 111a provided on the x stage 110 in the assembly and adjustment of the cross roller guides and is provided on the lower surface of the x stage 110. The bank 304b may be provided as a detachable component (jig) on the x stage 110. It is preferable to provide the adjusting screws 305b in accordance with the positions of screws (not shown) for fixing the x-axis cross roller guide 111a to the y stage 120. In this manner, the outer x-axis cross roller guides 111a to be fixed to the x stage 110 are arranged to sandwich the inner x-axis cross roller guides 111b on the y stage 120. In this state, the outer x-axis cross roller guides 111a are firmly fixed to the x stage 110, completing the assembly of the x-axis cross roller guides 111.

Figure 14A:
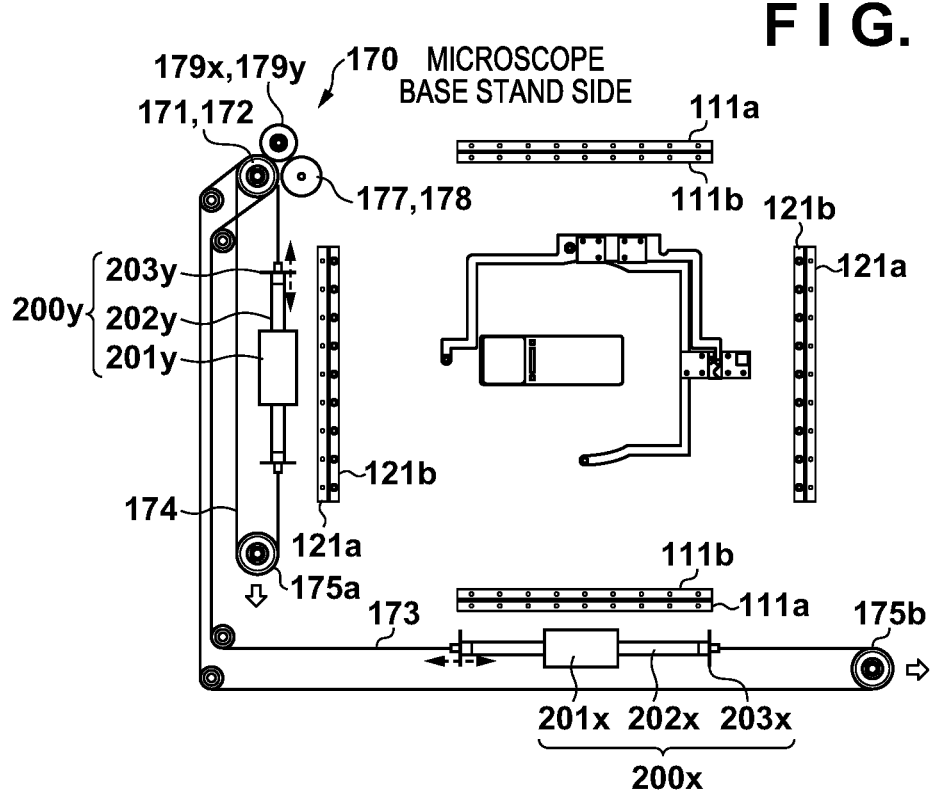
FIGS. 14A and 14B are views for explaining an example of the arrangement of the linear actuator.

FIG. 14A shows the layout of the x-axis cross roller guides 111, the y-axis cross roller guides 121, the linear actuator 200x for the x direction, the linear actuator 200y for the y direction, the manual driving mechanism 170, the x wire 173, and the y wire 174 described with reference to FIGS. 4, 5, 8, and 9. FIG. 14A shows the arrangement state of the components without discriminating between the upper and lower surfaces of the y stage 120. As for movement of the x stage 110 in the x direction, an x roller 177 connected to the shaft of the x knob 161 (FIG. 1) rotates in the manual driving mechanism 170 in accordance with the turning operation of the x knob 161. An x transmission roller 179x presses the x roller 177 and the x pulley 171 at the time of manual driving and transmits the rotation of the x roller 177 to the x pulley 171. Manual driving and electromotive driving are switched by switching between press to the x roller 177 and the x pulley 171 by the x transmission roller 179x and release. As for movement of the y stage 120 in the y direction, a y roller 178 connected to the shaft of the y knob 162 (FIG. 1) rotates in accordance with the turning operation of the y knob 162. A y transmission roller 179y presses the y roller 178 and the y pulley 172 at the time of manual driving and transmits the rotation of the y roller 178 to the y pulley 172.

Figure 14B:
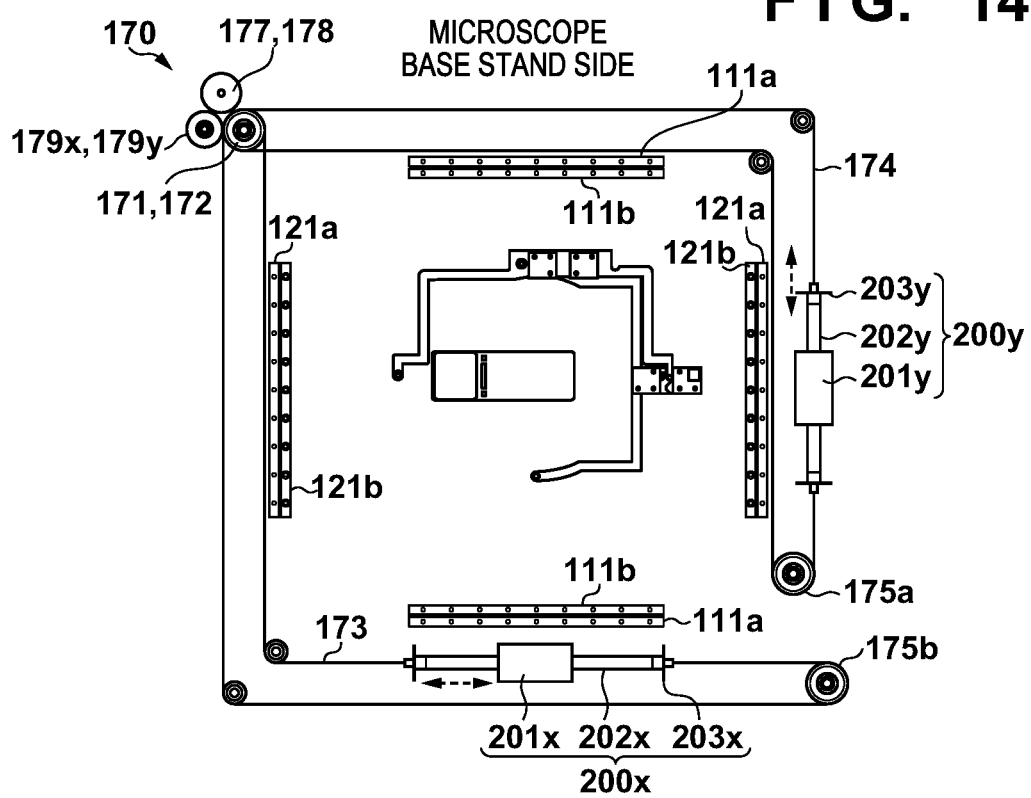

FIG. 14B is a view showing an example of another layout of the y wire 174. According to the layout in FIG. 14B, the arrangement positions of the manual driving mechanism 170 and linear actuators 200x and 200y are distributed and the stages are well-balanced. However, the layout distance of the x wire 173 increases.

As described above, according to the stage apparatus 100 of the first embodiment, the operating axis parallel to the moving direction of the stage becomes common between the shaft 202 serving as a driven portion at the time of electromotive driving and the driving wire serving as a driven portion at the time of manual driving. Thus, the position of the xy stage is maintained stably in switching between electromotive driving using the shaft motor (a linear motor using a shaft or a cylindrical linear motor when a shaft is a cylindrical) that hardly generates a backlash, and manual driving using the manual knob 160. For example, when the stage apparatus 100 is used as a microscope stage, an observation position does not shift in switching between electromotive driving and manual driving and the user can perform microscopic observation without feeling stressed.

Second Embodiment

The stage apparatus according to the first embodiment uses a shaft motor (a cylindrical linear motor) as a main component of the linear actuator. In general, the shaft motor is formed from a jacket member that is a separate member whose positional relationship is not mechanically fixed, and a shaft (a cylindrical rod member) that is inserted into the jacket member. This arrangement is advantageous in high degree of freedom of design, but requires alignment in mounting, is unsuitable for automation of assembly and adjustment, and raises the cost. For example, complicated work dependent on manpower is required to attach a jacket member to a driving-side stage and a cylindrical rod member to a driven-side stage at a predetermined precision with a proper positional relationship. Since the shaft and the jacket member are separate members whose positional relationship is not fixed till attachment, they need to be managed appropriately to prevent a scratch to the rod member, bending, and magnetic attachment of a metal piece or the like before assembly. This also raises the cost. The second embodiment discloses the distribution form of a linear actuator suitable for application to the above-described stage apparatus. The linear actuator according to the second embodiment simplifies the assembly and adjustment of the stage apparatus described in the first embodiment and reduces the manufacturing cost.

In the second embodiment, a linear actuator preferably used in the stage apparatus 100 according to the first embodiment will be further explained. Note that a linear actuator 200 exemplified in the second embodiment is not limited to application to a microscope stage, but can be provided as a linear actuator for various one-dimensional stages and two-dimensional stages.

The linear actuator 200 according to this embodiment is an integral linear actuator including
  a jacket member 201 and a linear motor in a form in which a shaft 202 is inserted into the through hole of the jacket member 201 (one of the jacket member 201 and the shaft 202 has a coil and the other has a permanent magnet),
  connecting portions configured to coaxially connect a wire for manual operation and the shaft 202, and
  a frame 203 configured to attach the shaft 202,
  wherein the linear actuator is provided in a state in which the axis of the shaft 202 is assembled at a predetermined precision with respect to the position reference of the frame 203 while the shaft 202 is inserted into the jacket member 201. The linear actuator 200 shown in FIG. 3A represents an example in which a linear actuator capable of obtaining the predetermined precision is constituted as a result of mounting. Examples of the arrangement of the linear actuator 200 according to this embodiment will be described below.

Example 1 of Arrangement

In a linear actuator 200a in FIGS. 15A to 15D, the wire connecting portions 204 of the linear actuator 200 described with reference to FIGS. 3A to 3D are modified. In the arrangement shown in FIGS. 3A to 3D, the wire connecting portions are attached to the shaft 202 via the frame 203 in mounting, and the position (phase) of each wire fixing screw 205 in the rotational direction can be set to an arbitrary position advantageous for mounting. To the contrary, in the arrangement of the integral linear actuator shown in FIGS. 15A to 15D, wire fixing portions (connecting covers 222 and wire fixing screws 205) can rotate with respect to shaft fixing portions (shaft fixing screws 221). After the integral linear actuator is attached, a wire can be fixed at a preferable position by rotating the positions of the wire fixing screws 205. In FIGS. 15A to 15D, as in FIGS. 3A to 3D, wire connecting portions 204 provide wire connecting mechanisms capable of mounting a driving wire coaxially with the shaft on the two end sides of the shaft.

Figure 15A:
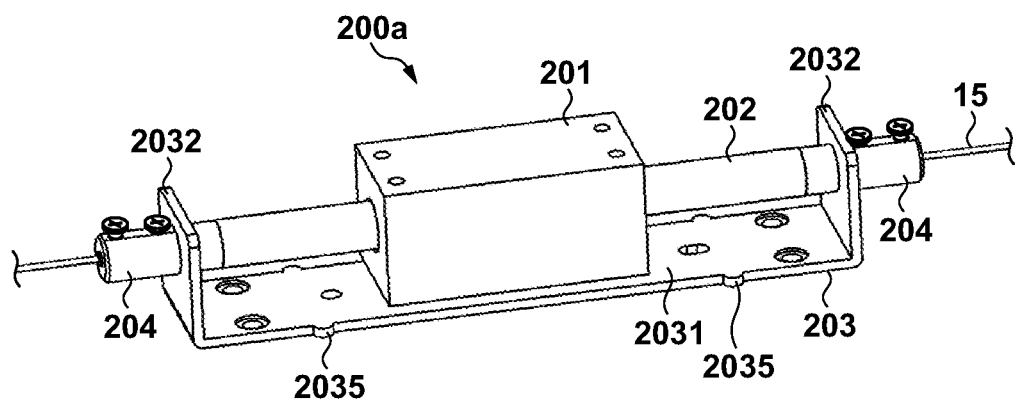
FIGS. 15A, 15B, 15C, and 15D are views for explaining an example of the structure of a linear actuator according to an embodiment.

FIG. 15A is a view showing the outer appearance of the linear actuator 200a. In a shaft motor in which the shaft 202 is inserted into the through hole of the jacket member 201, the two ends of the shaft 202 are fixed to the frame 203 by the wire connecting portions 204 at a predetermined precision. For example, the frame 203 has a square U shape and includes a bottom surface panel 2031 and side surface panels 2032 on the two sides. The two ends of the shaft 202 are fixed to the side surface panels 2032 at a predetermined precision. The wire connecting portions 204 include screw portions (the shaft fixing screws 221 in FIG. 15B) that fix the shaft 202 between the two side surface panels 2032 by screw-clamping the two end portions of the shaft 202 via through holes (not so large unlike in FIGS. 3A to 3D) of a predetermined precision formed in the two side surface panels 2032. The wire connecting portions 204 include wire fixing portions (the connecting covers 222 in FIG. 15B) that fix the end portions of a driving wire (an x wire 173 or a y wire 174) coaxially with the screw portions. This arrangement will be explained in detail below.

Figure 15B:
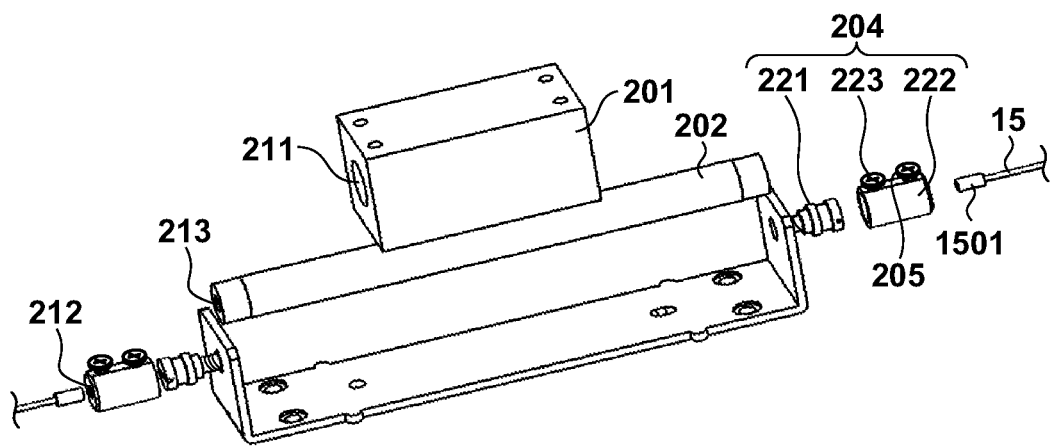
Figure 15C:
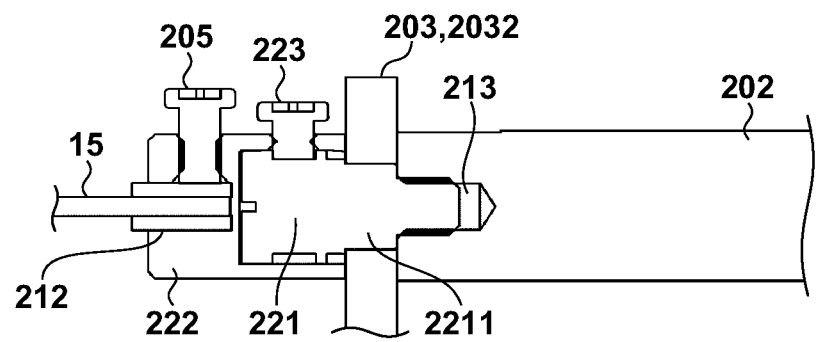

As shown in FIG. 15B, each wire connecting portion 204 of the linear actuator 200a includes the shaft fixing screw 221, the connecting cover 222, and a connecting cover fixing screw 223. As shown in FIG. 15C, the shaft fixing screw 221 fixes the shaft 202 to the side surface panel 2032 of the frame 203 by screw-fastening with the screw portion 213 provided at the end portion of the shaft 202. A cylindrical portion 2211 designed to be fitted in the through hole of the side surface panel 2032 is provided adjacent to the screw portion of the shaft fixing screw 221 so that the position of the axis of the shaft 202 and that of the axis of the shaft fixing screw 221 become coaxial at a predetermined precision. The connecting cover 222 has a recessed portion that receives the shaft fixing screw 221 inside, and has a hole configured for insertion of a driving wire 15 on a surface opposite to the recessed portion. The connecting cover 222 is fixed to the shaft fixing screw 221 by the connecting cover fixing screw 223. The end portion of the driving wire 15 inserted into the connecting cover 222 is fixed to the connecting cover 222 by the wire fixing screw 205. Note that a sleeve of a predetermined diameter is mounted at the distal end portion of the driving wire 15 so that the axis of the driving wire 15 and that of the shaft 202 coincide with each other more accurately.

In the linear actuator 200a having this arrangement, the driving wire 15 is connected coaxially with the shaft 202. The connecting cover 222 can be conveniently fixed to the shaft fixing screw 221 by the connecting cover fixing screw 223 at an arbitrary rotational position where access to the wire fixing screw 205 becomes easy. As described with reference to FIGS. 3A to 3D, the fixation of the driving wire 15 to a hole portion 212 is not limited to the illustrated form and any structure may be used. For example, the end portion of the driving wire 15 may be fixed to the hole portion 212 by caulking. It is also possible to insert the end portion of the driving wire into the hole portion of a cylindrical pin 1501 having a cylindrical hole, fix the driving wire by a screw or caulking, insert into the hole portion 212 the other end of the cylindrical pin having one end connected to the driving wire 15, and fix the cylindrical pin by the wire fixing screw 205, as shown in FIG. 15B. This also applies to linear actuators in example 2 and subsequent examples of the arrangement to be described later.

Figure 15D:
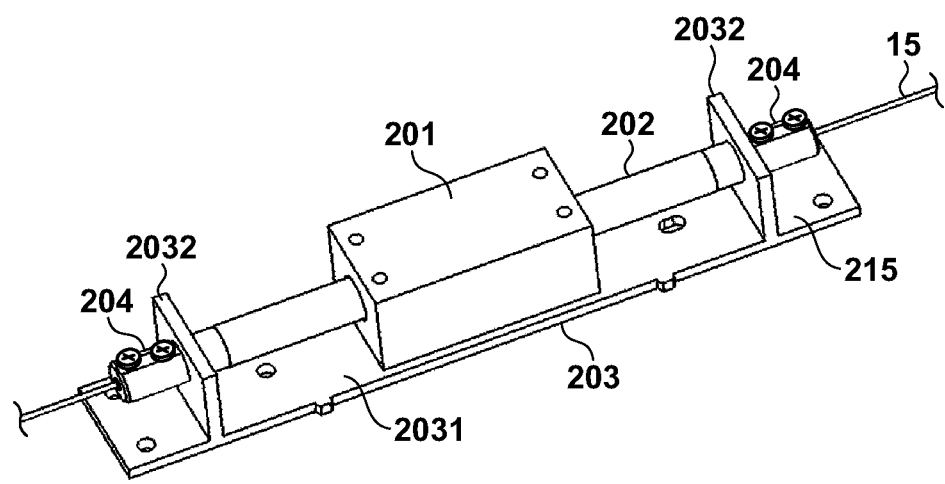

In FIG. 15D, the frame 203 includes the bottom surface panel 2031 that further extends outward from the side surface panels 2032 in the linear actuator 200a shown in FIG. 15A. In either of the forms of FIGS. 15A and 15D, the wire connecting portions 204 extend from the side surface panels 2032 and positions of the wire connecting portions 204 at which the wire is connected exist on the extension of the axis of the shaft 202.

Figure 20:
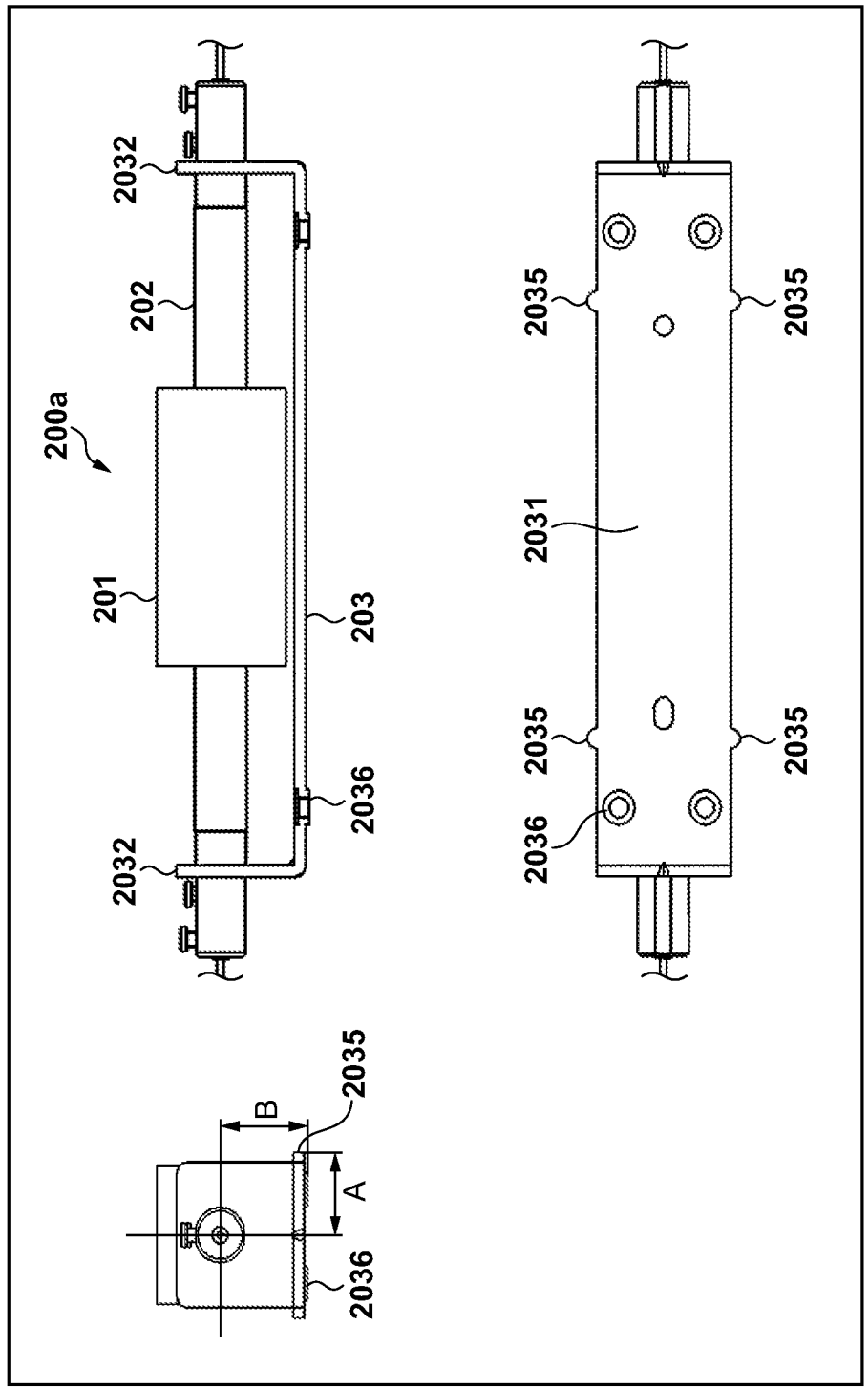
FIG. 20 is a view for explaining an example of position references in the linear actuator.

FIG. 20 is a view for explaining position references in the linear actuator 200a. The frame 203 has reference projecting portions 2035 and reference projecting portions 2036 serving as axial position references and axial direction references having predetermined positional relationships with respect to the axial position and the axial direction defined by through holes formed in the two side surface panels 2032. The axial position is the position of the center axis of the shaft 202 fixed to the frame 203, and the axial direction is the direction of the center axis. As shown in FIG. 20, the reference projecting portion 2035 defines a distance A from the top position of the reference projecting portion 2035 to the center position (coaxial position) of the shaft 202. The reference projecting portion 2036 around an attachment hole defines a distance B to the center position of the shaft 202. In this fashion, the reference projecting portions 2035 and 2036 define the axial position of the shaft 202. A line connecting the vertices of the reference projecting portions 2035 existing on the same side of the bottom surface panel indicates the axial direction of the shaft 202 (is parallel to the axial direction of the shaft 202).

By using the reference of the frame 203, the linear actuator 200a can be easily assembled into the stage apparatus 100 of the first embodiment at high precision. Also, in the following examples of the arrangement, the frame 203 has the same position references and axial direction references.

Example 2 of Arrangement

Figure 16A:
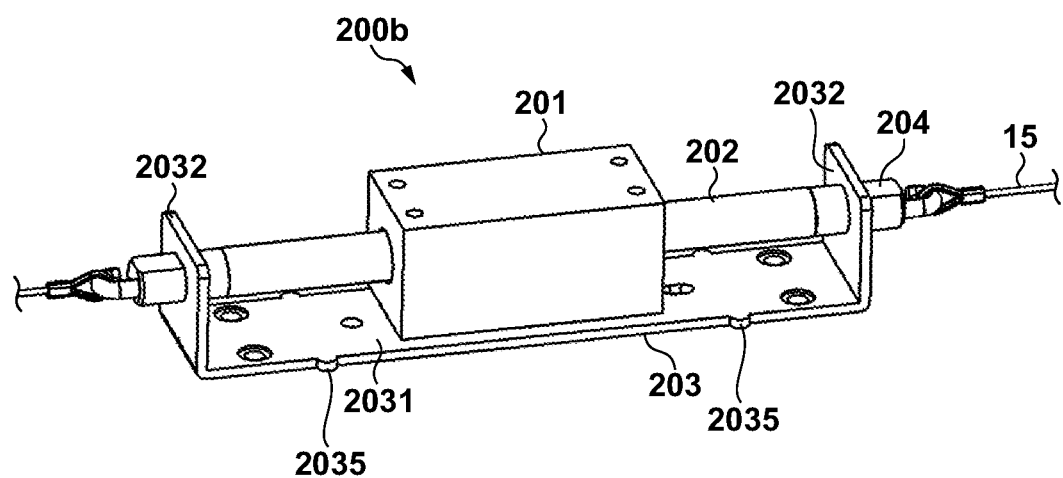
FIGS. 16A and 16B are views for explaining an example of the structure of a linear actuator according to the embodiment.
Figure 16B:
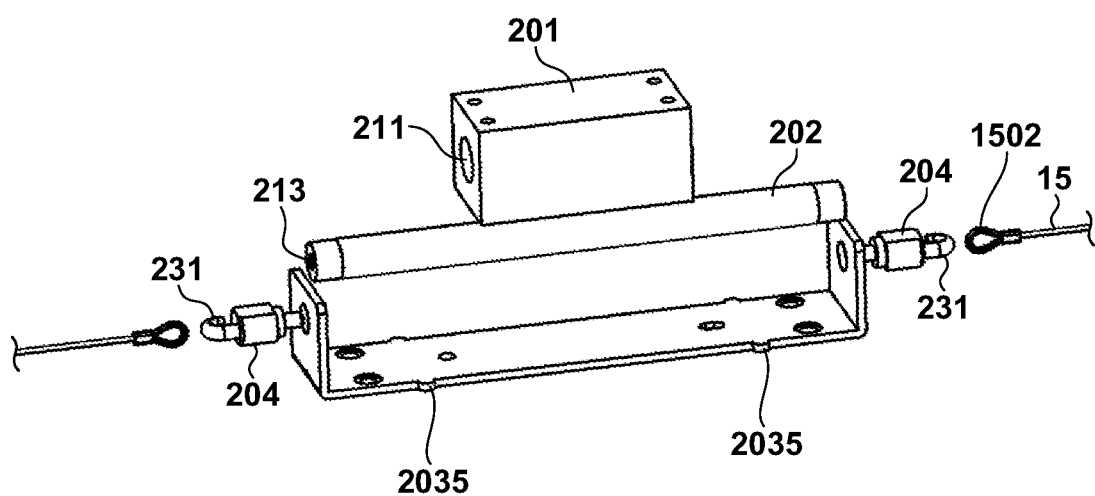

FIGS. 16A and 16B are views showing a linear actuator 200b as still another example of the arrangement of the linear actuator 200. FIG. 16A is a view showing the outer appearance of the linear actuator 200b. FIG. 16B is an exploded view of the linear actuator 200b. The shaft 202 is inserted into the through hole of the jacket member 201 and the two ends of the shaft 202 are fixed to the frame 203 by the wire connecting portions 204 at a predetermined precision. A screw portion suited to a screw portion 213 of the shaft 202 is formed at one end portion of each wire connecting portion 204 of the linear actuator 200b, and a hook portion 231 is formed at the other end portion. The two end portions of the shaft 202 are screw-clamped by the screw portions via through holes of a predetermined precision formed in the two side surface panels 2032, and the shaft 202 is fixed between the two side surface panels 2032 at a predetermined precision. The hook portion 231 serving as an end portion of the wire connecting mechanism has a hook shape to catch the driving wire 15 whose end portion is formed into a ring shape. Rings 1502 formed at the end portions of the driving wire 15 are hooked to the hook portions 231, connecting the shaft 202 and the wire coaxially.

Example 3 of Arrangement

Figure 17A:
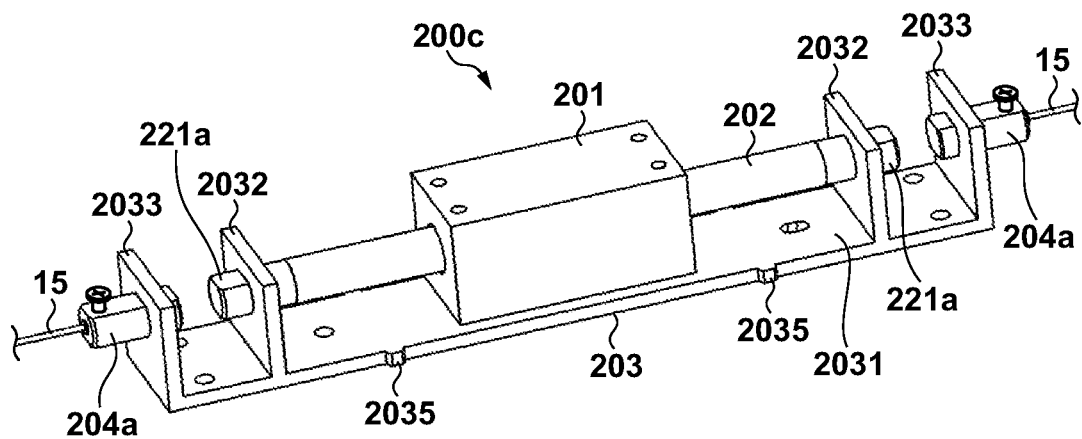
FIGS. 17A and 17B are views for explaining an example of the structure of a linear actuator according to the embodiment.
Figure 17B:
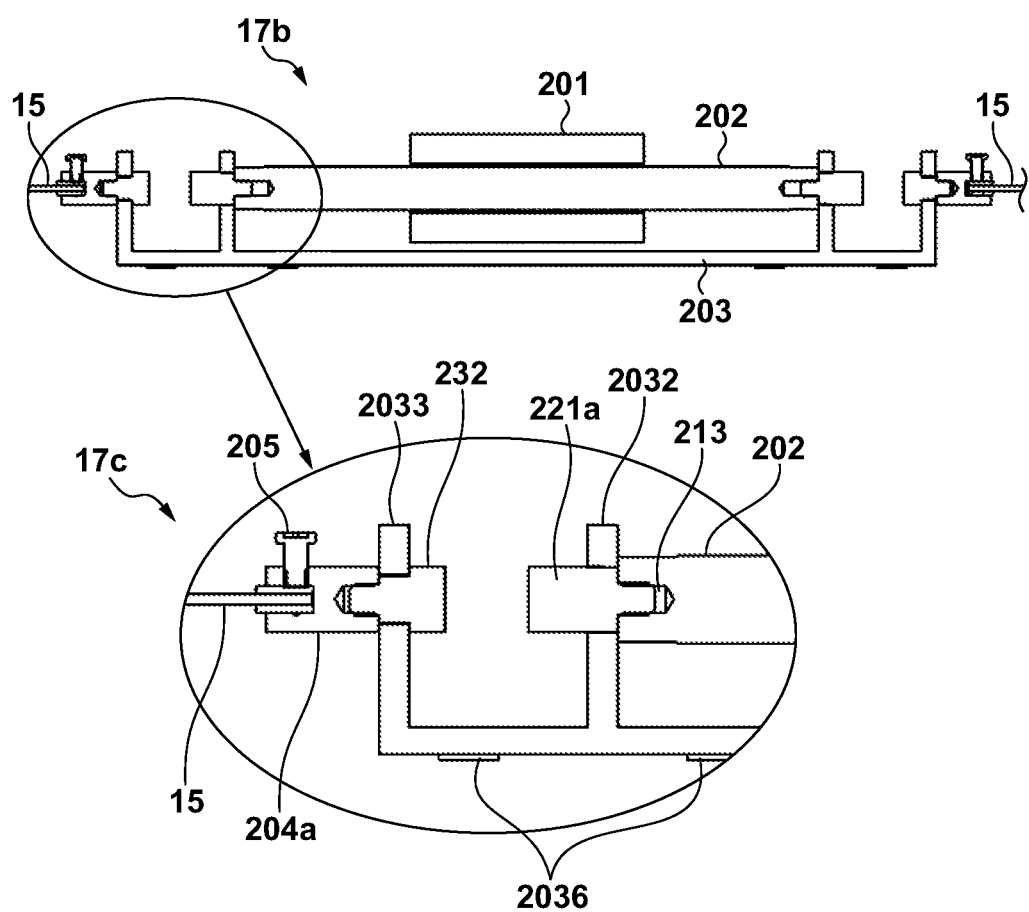

FIGS. 17A and 17B are views showing a linear actuator 200c as still another example of the arrangement of the linear actuator 200. FIG. 17A is a perspective view showing the outer appearance of the linear actuator 200c. In FIG. 17B, 17b is a sectional view of the linear actuator 200c and 17c is a detailed sectional view of the shaft fixing portion and the wire connecting portion. The frame 203 of the linear actuator 200c includes a pair of side surface panels 2032 perpendicular to the bottom surface panel 2031 and facing each other, and a pair of second side surface panels 2033 that are provided to sandwich the pair of side surface panels 2032, are perpendicular to the bottom surface panel 2031, and face each other.

The two ends of the shaft 202 are fixed to the side surface panels 2032 of the frame 203 by shaft fixing screws 221a in a state in which the shaft 202 is inserted into the through hole of the jacket member 201. The bottom surface panel 2031 of the frame 203 further extends outward from the positions of the side surface panels 2032, and the second side surface panels 2033 are provided at the two ends of the bottom surface panel 2031. The driving wire 15 is connected to the second side surface panels 2033 by wire connecting portions 204a.

As represented in 17c, the shaft 202 has the screw portions 213 at two ends, is screwed by the shaft fixing screws 221a via the side surface panels 2032, and fixed to the side surface panels 2032. A screw portion is provided at one end portion of each wire connecting portion 204a. The wire connecting portion 204a is screwed by a fixing screw 232 via the second side surface panel 2033 and fixed to the second side surface panel 2033. The holes of the side surface panel 2032 and second side surface panel 2033 are formed so that the shaft 202 and the wire are arranged coaxially.

In the above-described example, the second side surface panels 2033 configured to fix the wire connecting portions 204a are provided on the bottom surface panel 2031 further extending outward from the positions of the side surface panels 2032. However, the arrangement is not limited to this. Various modifications are possible as long as the shaft 202 and the driving wire 15 are fixed so that they become coaxial. For example, members each extending in the axial direction of the shaft 202 from one of three sides of the side surface panel 2032 on two sides and the top, and the second side surface panels 2033 at the ends of the members may be provided.

Example 4 of Arrangement

Figure 18A:
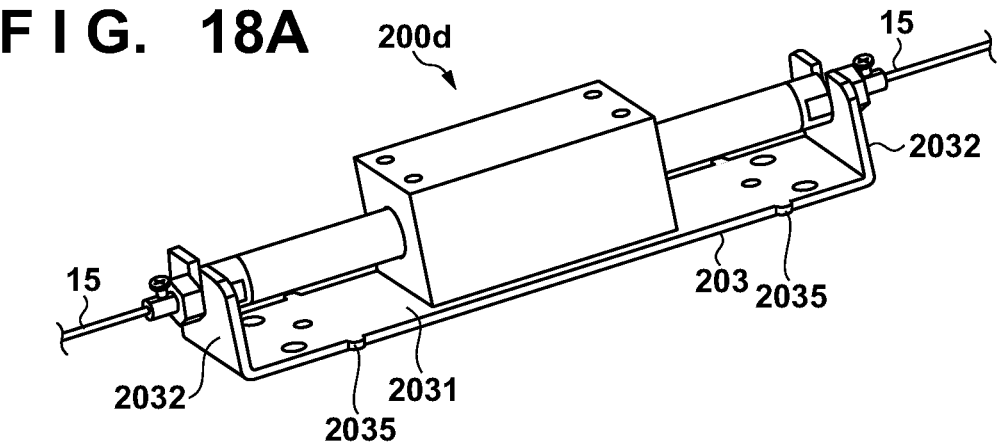
FIGS. 18A, 18B, and 18C are views for explaining an example of the structure of a linear actuator according to the embodiment.
Figure 18B:
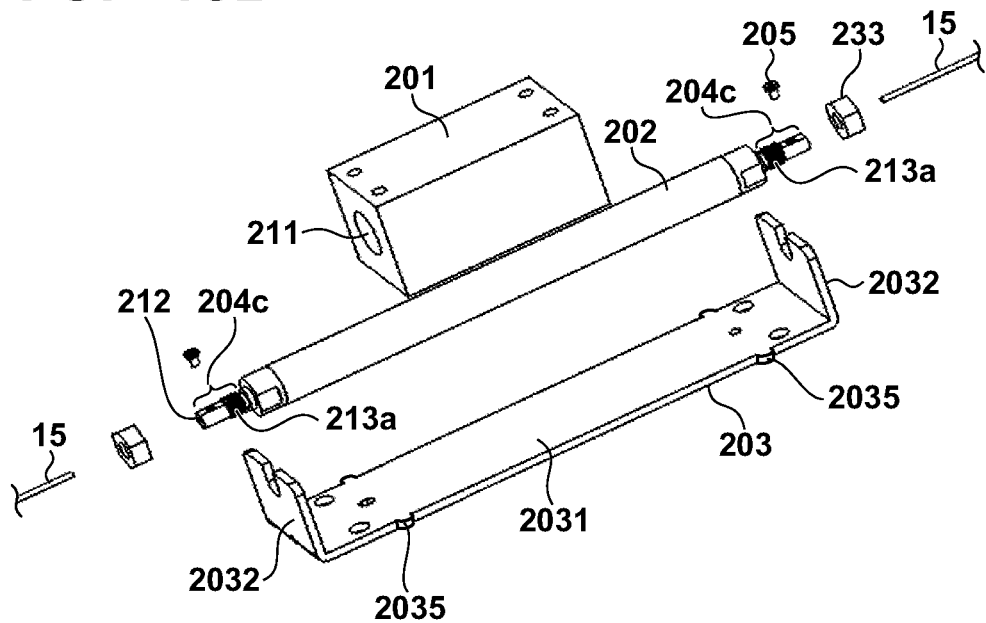
Figure 18C:
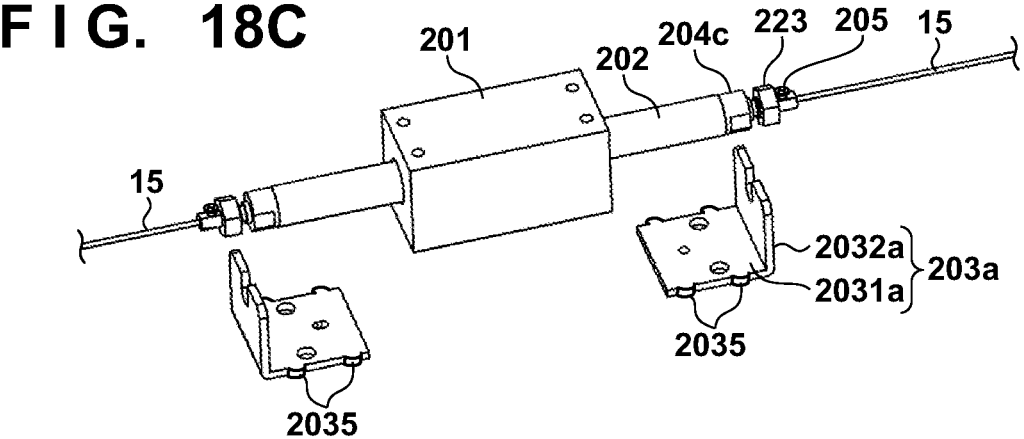

FIGS. 18A to 18C are views showing a linear actuator 200d as still another modification of the linear actuator 200. FIG. 18A is a perspective view showing the outer appearance of the linear actuator 200d. FIG. 18B is an exploded view of the linear actuator 200d, and FIG. 18C is a view showing a modification of the frame 203. In the linear actuator 200d, the shaft 202 has wire connecting portions 204c at the two ends in a shaft motor in which the shaft 202 is inserted into the through hole of the jacket member 201.

The shaft 202 is fixed to the side surface panels 2032 of the frame 203 by screw portions 213a of the wire connecting portions 204c and shaft fixing nuts 233. Each side surface panel 2032 has a U-shaped cut formed at a predetermined precision to receive the shaft 202 having the wire connecting portions 204c. That is, the shaft 202 is firmly inserted into the U-shaped cuts and the positional relationship between the axial position of the shaft 202 and the frame 203 is maintained to the same degree as shown in FIG. 20. The hole portion 212 designed to receive a wire is provided at the end face of the wire connecting portion 204c on the distal end side from the screw portion 213a. The driving wire 15 is inserted into the hole portions 212 and tightened in the radial direction by the wire fixing screws 205, fixing the driving wire 15 to the wire connecting portions 204c.

Note that separated frames 203a as shown in FIG. 18C may also be used as the frame 203 configured to fix to the stage the shaft 202 integrated with the wire connecting portions. Each separated frame 203a has an L shape formed from a bottom surface panel 2031a and a side surface panel 2032a. The positional relationship between the separated frames 203a and the shaft 202 needs to be held at a predetermined precision. Such separated frames can also be applied to the linear actuators shown in FIGS. 15A to 15D, FIGS. 16A and 16B, FIGS. 17A and 17B, and FIGS. 18A to 18C. Even when the shaft motor shown in FIGS. 3A to 3D is used, separated frames are convenient for mounting and the separated frames 203a may be built in the stage side.

Example 5 of Arrangement

FIGS. 19A to 19D are views showing a linear actuator 200e as still another modification of the linear actuator 200. The wire connecting mechanism of the linear actuator 200e includes an arrangement for moving the fixing position of the driving wire in the axial direction of the shaft 202. This allows adjustment of the tension of the driving wire 15. In general, the tension of the driving wire is adjusted by movement of a pulley 175a in the y direction or movement of a pulley 175b in the x direction in, for example, FIG. 14A. However, it is necessary to add a pulley movement adjusting mechanism and ensure an access path for tension adjustment, which raises the cost. To the contrary, the linear actuator 200e can adjust the tension of the driving wire on the frame 203 by an arrangement to be described below. A user can execute tension adjustment more easily.

Figure 19A:
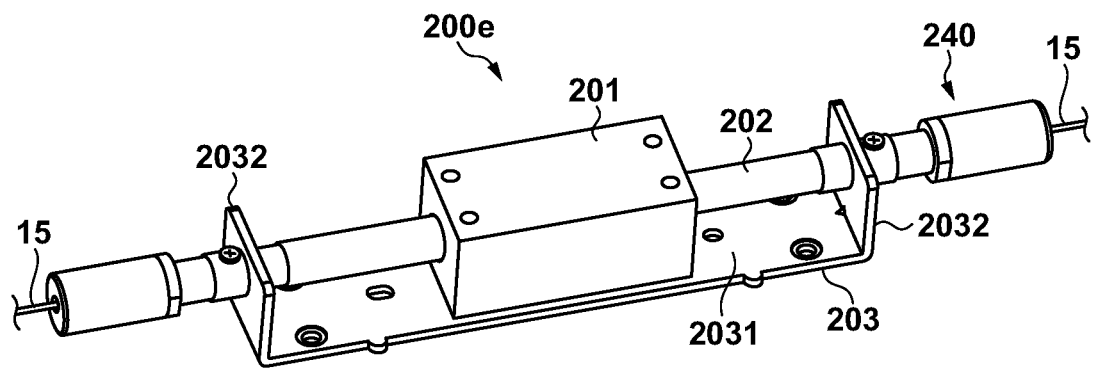
FIGS. 19A, 19B, 19C, and 19D are views for explaining an example of the structure of a linear actuator according to the embodiment.
Figure 19B:
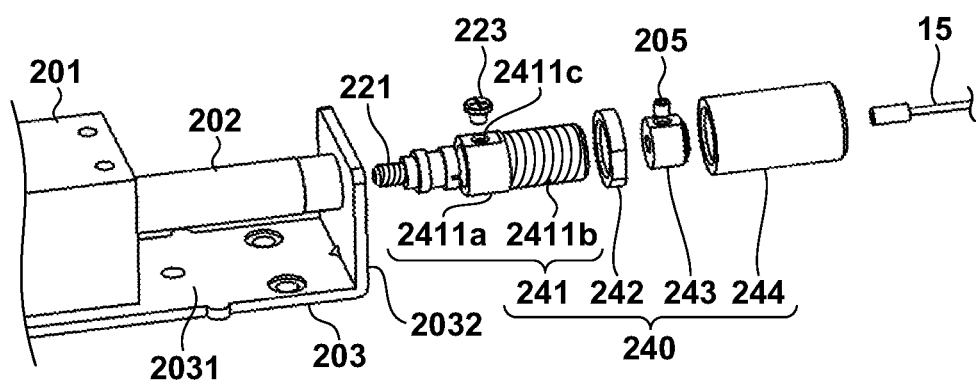
Figure 19C:
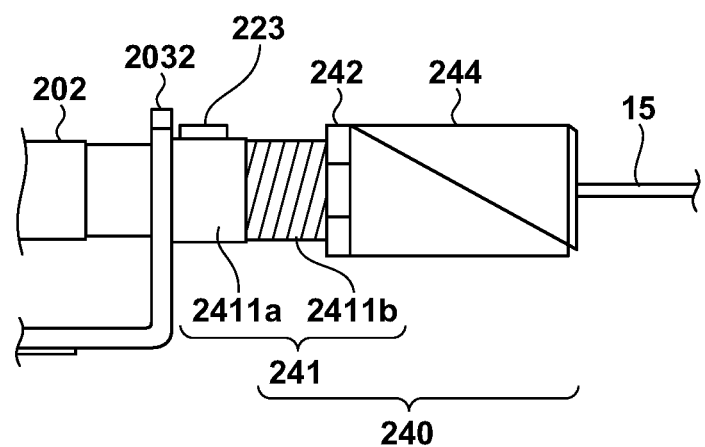
Figure 19D:
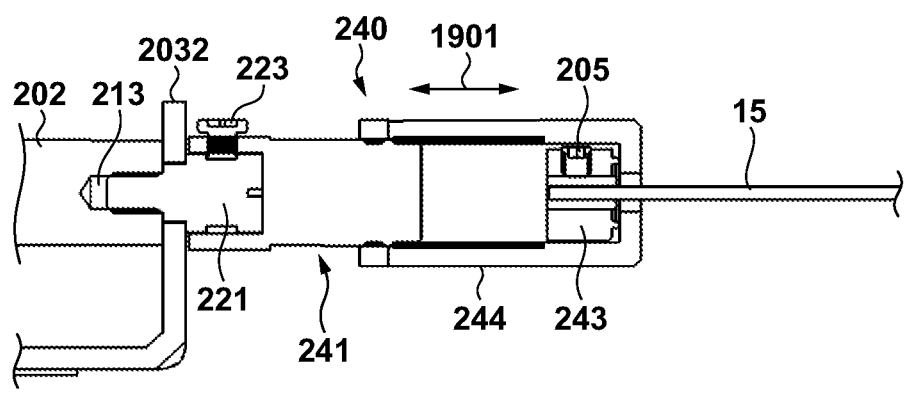

The linear actuator 200e includes tension adjusting mechanisms 240 that fix the shaft 202 to the side surface panels 2032, connect the x wire 173 or the y wire 174, and enable adjustment of the tension of the connected wire. FIG. 19A is a view showing the outer appearance of the linear actuator 200e. FIG. 19B is an exploded view of the arrangement of the shaft fixing portion and tension adjusting mechanism 240. FIG. 19C is a view of the assembly state of the tension adjusting mechanism. FIG. 19D is a sectional view of the arrangement of the tension adjusting mechanism 240.

As shown in FIGS. 19B and 19D, the shaft 202 is screwed to each side surface panel 2032 by the screw portion 213 formed on the end face of the shaft 202 and the shaft fixing screw 221 and is fixed at a predetermined precision. Each tension adjusting mechanism 240 includes an adjusting screw unit 241, an adjusting sleeve fixing nut 242, a wire fixing portion 243, and a tension adjusting sleeve 244. The adjusting screw unit 241 includes a cylindrical portion 2411a having a recessed portion configured to accommodate the shaft fixing screw 221, and a screw portion 2411b that fits the adjusting sleeve fixing nut 242 and a screw formed on the tension adjusting sleeve 244. A threaded hole 2411c for the fixing screw 223 is provided at the cylindrical portion 2411a.

First, the shaft 202 is fixed to the frame 203 (each side surface panel 2032) by the shaft fixing screw 221 at a predetermined precision. Then, the adjusting screw unit 241 is fixed to the shaft fixing screw 221 by the fixing screw 223 in a state in which the shaft fixing screw 221 is covered with the recessed portion of the adjusting screw unit 241 and accommodated. The wire fixing portion 243 has a hole configured for insertion of the driving wire 15, and fixes, by the wire fixing screw 205, the driving wire 15 inserted into the hole via the through hole of the tension adjusting sleeve 244. The wire fixing portion 243 is accommodated inside the tension adjusting sleeve 244. The tension adjusting sleeve 244 (having a screw portion inside) is turned and screwed into the screw portion of the adjusting screw unit 241. By changing the position of the tension adjusting sleeve 244, the position of the wire fixing portion 243 can be moved in the axial direction (in a direction indicated by an arrow 1901) to adjust the tension of the driving wire 15. That is, the distance between the wire fixing portions 243 on the two sides of the linear actuator 200e changes in accordance with a change of the positions of the tension adjusting sleeves 244. After the end of tension adjustment, the tension adjusting sleeve 244 is tightened by the adjusting sleeve fixing nut 242 and the position of the tension adjusting sleeve 244 at the adjusting screw unit 241 is fixed. In this fashion, the tension of the driving wire 15 can be adjusted. Although the tension adjusting mechanisms are arranged on the two ends of the shaft of the linear actuator in the above description, the tension adjusting mechanism may be arranged on only one side.

Note that the above-described tension adjusting mechanism 240 is applicable to any form such as a form in which a wire connecting portion has a hook shape as in FIG. 16A, a form in which a wire connecting portion is provided on another side surface panel as in FIG. 17A, or a form in which wire connecting portions are provided at the two ends of a shaft as in FIG. 18A.

According to the above-described embodiments, generation of a slight movement of a stage position (observation position) when switching between the automatic mode and the manual mode is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A stage apparatus comprising:
a first stage;
a second stage that moves in a first direction on a surface of the first stage;
a first driving mechanism including a pulley that rotates in accordance with a manual operation of a user configured to drive a first driven portion including a wire that is moved by the pulley and configured to move the second stage in the first direction by a manual driving force; and
a second driving mechanism including a shaft motor including a jacket member and a shaft inserted into a hole extending through the jacket member configured to drive a second driven portion including the shaft of the shaft motor and configured to move the second stage in the first direction by an electromotive driving force, wherein
the shaft is fixed to the first stage, the jacket member and the pulley are fixed to the second stage, and the wire serving as the first driven portion is connected to be coaxial with an axis of the shaft at a position on an extension of the axis of the shaft.

2. The stage apparatus according to claim 1, wherein both a direction of the axis of the wire and a direction of the axis of the shaft are parallel to the first direction at a portion where the wire and the shaft are connected to be coaxial.

3. The stage apparatus according to claim 1, wherein the first direction is defined by cross roller guides arranged on the first stage and the second stage.

4. The stage apparatus according to claim 1, wherein the shaft is fixed to the first stage via a frame including two side surface panels configured to fix two ends of the shaft and a bottom surface panel configured to fix the two side surface panels.

5. The stage apparatus according to claim 1, wherein the jacket member is fixed to the second stage, the shaft is fixed to the first stage, and the wire is connected to two end portions of the shaft.

6. The stage apparatus according to claim 4, wherein the frame is fixed to the first stage.

7. The stage apparatus according to claim 1, wherein one of the shaft and the jacket member includes a coil, and the other one of the shaft and the jacket member includes a magnet.

8. The stage apparatus according to claim 1, wherein a cross-section of the shaft is circular.

9. The stage apparatus according to claim 1, further comprising cross roller guides configured to stack the second stage on the surface of the first stage movably in the first direction, the cross roller guides arranged on the first stage having recessed portions that are configured for the insertion of cross rollers and face in an outer direction of the stage, and the cross roller guides arranged on the second stage having recessed portions that are configured for the insertion of cross rollers and face in an inner direction.

10. A stage apparatus, comprising:
a first stage;
a second stage that moves in a first direction on a surface of the first stage;
a first driving mechanism that drives a first driven portion configured to move the second stage in the first direction by a manual driving force;
a second driving mechanism that drives a second driven portion configured to move the second stage in the first direction by an electromotive driving force;
a third stage that moves in a second direction different from the first direction on a surface of the second stage;
a third driving mechanism that drives a third driven portion configured to move the third stage in the second direction by a manual driving force; and
a fourth driving mechanism that drives a fourth driven portion configured to move the third stage in the second direction by an electromotive driving force,
wherein a motion direction of the first driven portion and a motion direction of the second driven portion are parallel to each other at least partially, and
wherein a motion direction of the third driven portion and a motion direction of the fourth driven portion are parallel to each other at least partially.

11. The stage apparatus according to claim 10, wherein the motion directions of the first driven portion and the second driven portion are parallel to the first direction, and the motion directions of the third driven portion and the fourth driven portion are parallel to the second direction.

12. The stage apparatus according to claim 10, wherein the first driving mechanism and the third driving mechanism, and the second driving mechanism and the fourth driving mechanism are arranged dispersedly on three different sides of the second stage, respectively.

13. The stage apparatus according to claim 10, wherein the first driving mechanism, the second driving mechanism, and a cross roller guide that defines movement in the first direction are provided on a surface of the second stage that faces the first stage, and
the third driving mechanism, the fourth driving mechanism, and a cross roller guide that defines movement in the second direction are provided on a surface of the second stage that faces the third stage.

14. The stage apparatus according to claim 10, wherein the first driving mechanism, the second driving mechanism, a cross roller guide that defines movement in the first direction, the third driving mechanism, the fourth driving mechanism, and a cross roller guide that defines movement in the second direction are provided on a surface of the second stage that faces the first stage.

* * * * *